(12) United States Patent
Sciarrino

(10) Patent No.: US 10,896,060 B1
(45) Date of Patent: Jan. 19, 2021

(54) RESOURCE MONITOR FOR MONITORING LONG-STANDING COMPUTING RESOURCES

(71) Applicant: Capital One Services, LLC, McLean, VA (US)

(72) Inventor: Michael Sciarrino, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/742,660

(22) Filed: Jan. 14, 2020

(51) Int. Cl.
*G06F 9/50* (2006.01)
*G06F 9/48* (2006.01)
*G06F 9/54* (2006.01)
*G06F 11/30* (2006.01)
*G06N 20/00* (2019.01)

(52) U.S. Cl.
CPC .............. *G06F 9/5005* (2013.01); *G06F 9/48* (2013.01); *G06F 9/4837* (2013.01); *G06F 9/50* (2013.01); *G06F 9/5011* (2013.01); *G06F 9/5061* (2013.01); *G06F 9/54* (2013.01); *G06F 9/542* (2013.01); *G06F 9/546* (2013.01); *G06F 11/30* (2013.01); *G06F 11/3006* (2013.01); *G06F 11/3065* (2013.01); *G06F 11/3072* (2013.01); *G06F 11/3075* (2013.01); *G06N 20/00* (2019.01); *G06F 2209/508* (2013.01)

(58) Field of Classification Search
CPC ... G06F 9/455; G06F 9/48; G06F 9/50; G06F 9/5005; G06F 9/5011; G06F 9/5061; G06F 9/54; G06F 9/542; G06F 11/30; G06F 11/3003; G06F 11/3006; G06F 11/3065; G06F 11/3072; G06F 11/3075
See application file for complete search history.

(56) References Cited

U.S. PATENT DOCUMENTS

| 10,142,204 | B2 | 11/2018 | Nickolov et al. |
| 10,498,665 | B1 * | 12/2019 | Meck ............... H04L 67/02 |
| 2011/0016467 | A1 * | 1/2011 | Kane ............... G06F 9/45558 |
| | | | 718/1 |

(Continued)

OTHER PUBLICATIONS

Hopmans, T., Using AWS Lambda and Slack to have fun while saving on EMR costs, The Marketing Technologist (Dec. 4, 2017), https://www.themarketingtechnologist.co/using-aws-lambda-and-slack-to-have-fun-while-saving-on-emr-costs/.

*Primary Examiner* — Charles M Swift
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for monitoring long-standing computing resources. An apparatus may operate by receiving a cloud monitoring notification, where the cloud monitoring notification may indicate an occurrence of a monitored condition. The apparatus may then operate by scanning a cluster computing system for resource having a client assigned resource identifier and a computing resource attribute based on a resource identifier scan parameter and a resource attribute scan parameter. The apparatus may further operate by generating a resource notification request based on the scanning of the cluster computing system and transmitting the resource notification request to a communications system to notify a user that the resource has a computing resource attribute that match the resource attribute scan parameter.

20 Claims, 11 Drawing Sheets

(56) References Cited

U.S. PATENT DOCUMENTS

| | | | |
|---|---|---|---|
| 2012/0317274 A1* | 12/2012 | Richter | G06Q 10/06 709/224 |
| 2014/0136779 A1* | 5/2014 | Guha | G06F 9/5066 711/114 |
| 2016/0094419 A1* | 3/2016 | Peacock | H04L 67/1097 709/213 |
| 2016/0112538 A1* | 4/2016 | Wo | H04L 67/32 709/225 |
| 2016/0373405 A1* | 12/2016 | Miller | G06F 9/45558 |
| 2017/0017521 A1* | 1/2017 | Gupta | G06F 9/5011 |
| 2017/0235596 A1* | 8/2017 | Vankadaru | G06F 3/04847 718/1 |
| 2017/0329648 A1* | 11/2017 | Ren | G06F 9/46 |
| 2018/0101399 A1* | 4/2018 | Jain | G06F 9/4881 |
| 2018/0114234 A1 | 4/2018 | Fighel | |
| 2018/0324051 A1 | 11/2018 | Dias et al. | |
| 2018/0357088 A1* | 12/2018 | Inbaraj | G06F 11/3006 |
| 2019/0014018 A1* | 1/2019 | Ramalingam | G08B 5/22 |
| 2019/0097909 A1 | 3/2019 | Puri et al. | |

\* cited by examiner

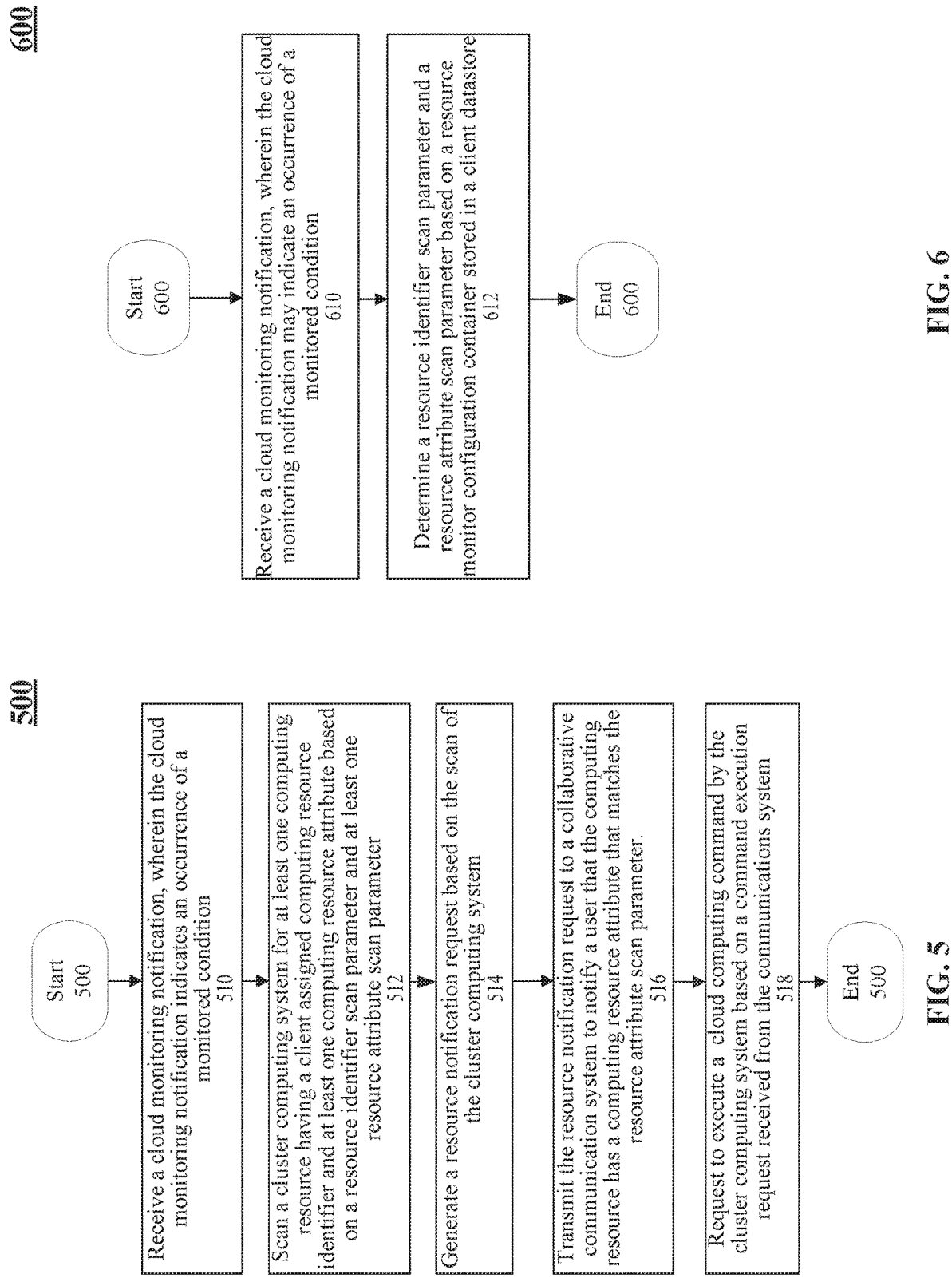

RESOURCE MONITOR FOR MONITORING LONG-STANDING COMPUTING RESOURCES

BACKGROUND

Field

This disclosure is generally directed to a resource monitor for long-standing computing resources, such as, for example, computing cluster.

Background

The transition of the traditional physical infrastructure to cloud based services providers has allowed application developers to focus more on the development of their applications rather than maintaining their own physical infrastructure. With more and more application developers moving to service-oriented architectures, the availability of computing resources even in the largest cloud computing services providers may become limited during peak demands. Accordingly, in order to reduce demand and free up computing resources, new solutions are needed to detect idle or otherwise long-standing computing resources and free them so that they may become available for use.

BRIEF SUMMARY

Provided herein are system, apparatus, article of manufacture, method and/or computer program product embodiments, and/or combinations and sub-combinations thereof, a resource monitor for monitoring long-standing computing resources.

An embodiment includes a server device that includes at least one processor and memory coupled to the at least one processor configured for monitoring long-standing computing resources. The at least one processor may be configured to receive, a cloud monitoring notification where the cloud monitoring notification may indicate an occurrence of a monitored condition. The at least one processor may also be configured to scan a cluster computing system for at least one resource having a client assigned resource identifier and at least one computing resource attribute based on a resource identifier scan parameter and at least one resource attribute scan parameter. The at least one processor may be further configured to generate a resource notification request based on the scan of the cluster computing system and transmit, the resource notification request to a communications system to notify a user that the resource has a computing resource attribute that matches the resource attribute scan parameter.

Another embodiment includes a computer-implemented method for monitoring long-standing computing resources. The method may operate by receiving a cloud monitoring notification, where the cloud monitoring notification may indicate an occurrence of a monitored condition. The method may also operate by scanning a cluster computing system for resource having a client assigned resource identifier and a computing resource attribute based at least on a resource identifier scan parameter and a resource attribute scan parameter. The method may further operate by generating a resource notification request based on the scanning of the cluster computing system and transmitting the resource notification request to a communications system to notify a user that the resource has a computing resource attribute that match the resource attribute scan parameter.

A further embodiment includes a tangible computer-readable device having instructions stored thereon that, when executed by at least one computing device, causes the at least one computing device to perform operations. The operations may include receiving a cloud monitoring notification, where the cloud monitoring notification may indicate an occurrence of a monitored condition. The operations may also include scanning a cluster computing system for resource having a client assigned resource identifier and a computing resource attribute based on a resource identifier scan parameter and a resource attribute scan parameter. The operations may further include generating a resource notification request based on the scanning of the cluster computing system and transmitting the resource notification request to a communications system to notify a user that the resource has a computing resource attribute that match the resource attribute scan parameter.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings are incorporated herein and form a part of the specification.

FIG. 5 illustrates a logic flow that may be performed by a configurable resource monitor application for monitoring long-standing computing resources according to an example embodiment.

FIG. 6 illustrates a logic flow that may be performed by a monitor component of a configurable resource monitor application for monitoring long-standing computing resources according to an example embodiment.

Like reference numerals refer to corresponding parts throughout the several views of the drawings. Additionally and generally, the left-most digit(s) of a reference number identifies the drawing in which the reference number first appears.

DETAILED DESCRIPTION

Figure 1:
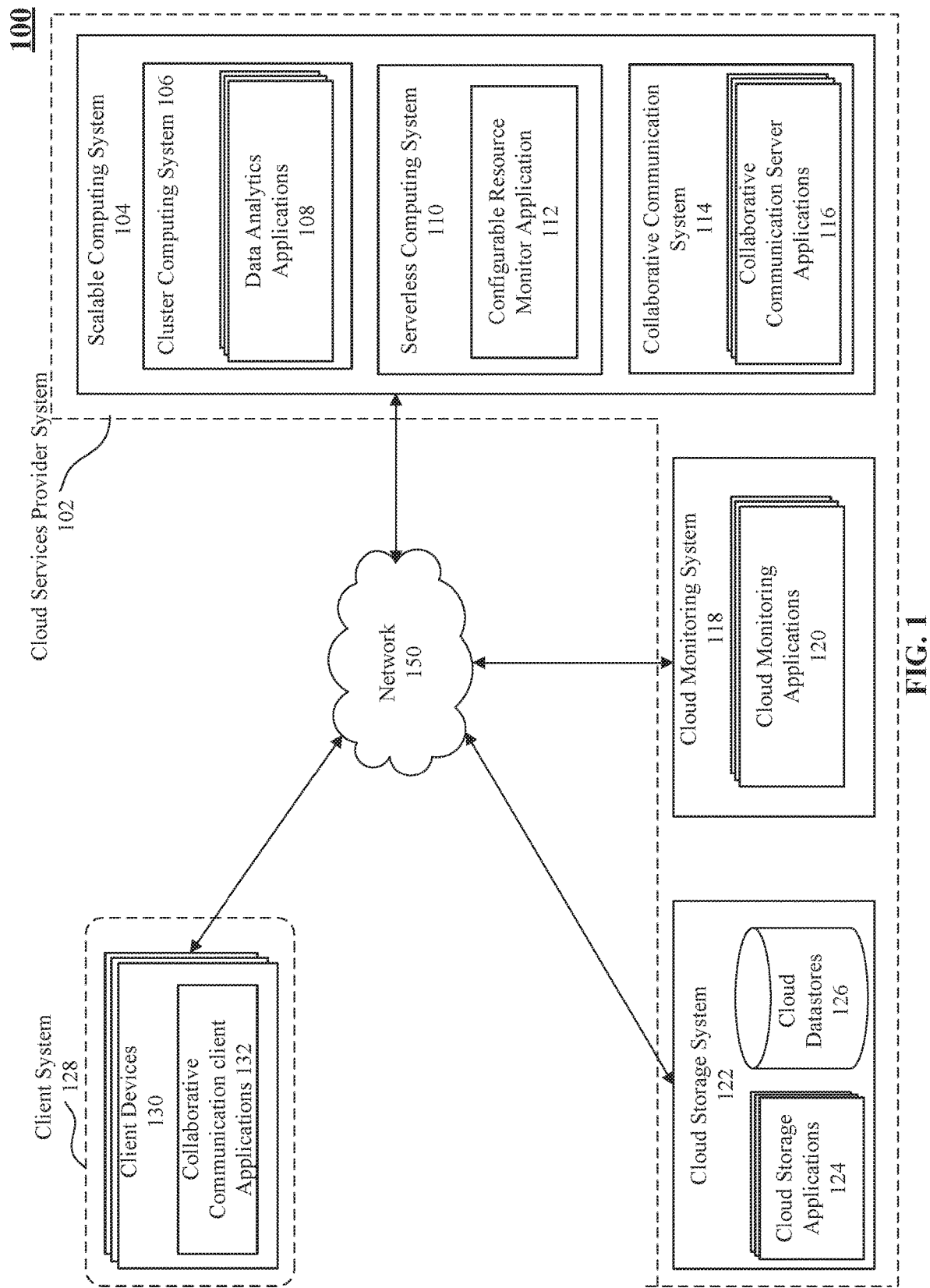
FIG. 1 illustrates a resource monitoring system for monitoring clusters in a cluster computing system according to an example embodiment.

Many users and/or teams in a business organization have issues when using a cloud services provider system (e.g., Amazon® Web Services® (AWS®), Microsoft® Azure®, Google® Anthos®, etc.) to perform data analytics (e.g., MapReduce operations, etc.) that may require a large number of computing resources (e.g., a computing cluster with large number of master nodes and slave nodes provisioned on multiple virtual machines, etc.). One such issue is that users and/or teams may often forget to terminate a large number of long-standing or idle computing resources. Such an issue may not only result in the business organization incurring a substantial financial cost to maintain long-standing or idle computing resources in a cloud services provider system, but also prevents other users and/or teams in a business organization from using them. Indeed, while cloud services provider systems may appear to have nearly infinite amount of computing resources available to their clients, availability of these computing resources in practice may be far more limited.

For example, cloud services provider systems often divide their physical server devices that provide computing resources to clients into specific geographic locations around the world. With multi-tenant architecture used by almost all cloud services provider systems, multiple clients may be required to share the same available computing resources (e.g., server devices and virtual machines, etc.) as one or more tenants in a cloud services provider system. Given the privacy concerns with some clients' data, data analytics may be confined to a specific geographic location. Additionally, given the amount of clients' data that may need to be processed at specific times and within a specific time limit, each client within a geographic location may be competing for a large amount of computing resources. This combination of factors may severely limit the availability of computing resources during peak demand.

While existing solutions may allow automatic termination of computing resources, they may not provide the ability for users and/or teams to make a judgement as to whether such long-standing or idle computing resources may be safely freed as they are no longer being used. Additionally, some solutions may only operate during a specific time of the day (e.g., midnight, etc.) without giving the ability for users and/or teams to make any judgement on computing resources in use. Nor can they be beneficial (and may even be detrimental) when computing resources may be exclusively used at specific time periods (e.g., overnight). Thus, some embodiments disclosed herein can detect idle or otherwise long-standing computing resources and free them safely so they may be used once again by the client rather than standing idle.

Specifically, some embodiments disclosed herein may scan all computing resources within a cluster computing system having an associated client assigned computing resource identifier, and find long-standing or idle computing resources (e.g., computing clusters) with the associated client assigned computing resource identifier that have been running for longer than a given threshold. Both the client assigned computing resource identifier to scan for and the given threshold may be configurable based on the needs of one or more users and/or teams of a business organization. Once these long-standing or idle computing resources have been identified, a message may be provided to the users and/or teams via a collaborative communication system. The message may include a cloud computing resource identifier (e.g., cloud computing cluster identifier to identify a computing cluster, etc.), elapsed time from creation of the computing resource, the number of supporting computing resources used (e.g., number of master nodes and slave nodes, number of virtual machines, etc.) the type of development environment (e.g., production environment, testing or quality assurance environment, etc.) and the geographic region (e.g., Northern Virginia, Ohio, Northern California, Montreal, Ireland, Frankfurt, Singapore, etc.)

In some embodiments, by providing the message to users and/or teams rather than automatically terminating long-standing or idle computing resources, users and/or teams can make an appropriate judgement call to safely terminate long-standing or idle computing resources. Some embodiments allow users and teams the flexibility to be alerted on any cadence and for any threshold elapsed time. Some embodiments allow users and/or teams to safely terminate long-standing or idle computing resources (e.g., computing clusters, etc.) and free up supporting computing resources (e.g., virtual processors, RAM) for use by one or more users and teams. Some embodiments also reduce the high cost accrued by leaving computing resources idling longer than they were intended.

In some embodiments, the term "computing resource" as discussed throughout the detailed description may generally represent any hardware and/or software systems, applications, and/or components. In some embodiments, the "computing resource" may vary based on the context in which it is discussed throughout. For example and in the context of a scalable computing system (e.g., scalable computing system 104), a "computing resource" may represent a virtual machine (e.g., virtual machine 210-1, etc.), a server device (e.g., server device 280-3, etc.), and/or the like. In another example and in the context of a cluster computing system (e.g., cluster computing system 106), a "computing resource" may represent a computing cluster (e.g., master node 206 and slave nodes 208-1, 208-2, 208-3, 208-4, 208-5, etc.), a virtual machine (e.g., virtual machine 210-1, etc.), and/or the like. In a further example and in the context of a server device (e.g., server device 280-1, etc.), a "computing resource" may represent a set of physical processors of a server device (e.g., server device 280, etc.), total RAM of a server device (e.g., server device 280, etc.).

In some embodiments, the scope and definition of the term "computing resource" may vary depending context, thus the term "cloud computing resource identifier" as discussed throughout the detailed description may generally represent any identifier that may be assigned to hardware and/or software systems, applications, and/or components to identify these systems, applications, and/or components. For example, and in the context of a cluster computing system (e.g., cluster computing system 106), a "cloud computing resource identifier" may include a cloud computing cluster identifier that identifies a computing cluster. In another example, and in the context of a scalable computing system (e.g., scalable computing system 104), a "cloud computing resource identifier" may include a cloud VM identifier that identifies a virtual machine executing on a server device. In a further example and in the context of a serverless computing system (e.g., serverless computing system 110), a "cloud computing resource identifier" may include a serverless application identifier that identifies a serverless application (e.g., serverless application 234-1).

FIG. 1 illustrates a resource monitoring system 100 for monitoring clusters in a cluster computing system according to an example embodiment.

In one embodiment, the resource monitoring system 100 may include a cloud services provider system 102 and a tenant system 128. The cloud services provider system 102 may further include a scalable computing system 104, a cloud monitoring system 118, and a cloud storage system 122. The scalable computing system 106 may further include a cluster computing system 106, a serverless computing system 110, and a collaborative communication system 114. All of these systems may be operatively and/or communicatively coupled via a network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX® IEEE 802.16, Global Systems for Mobile Communications (GSM), Enhanced Data Rates for GSM Evolution (EDGE), 3G, 4G, Long Term Evolution (LTE®), 5G, Bluetooth standards, Near Field Communications (NFC) standards, etc.). Additionally, or alternatively, the network 150 may also include various wired network devices configured to receive and/or transmit the encoded information as electrical and/or optical signals consistent with one or more wired and/or optical network standards (e.g., Ethernet, Fibre Channel, etc.).

In various embodiments, the cloud services provider system 102 may be representative of a system generally arranged to provide cloud computing services such as, for example, Infrastructure as a Service (IaaS), Platform as a Service (PaaS), Desktop as a Service (DaaS), Software as a Service (SaaS), Storage as a Service (StaaS), Function as a Service (FaaS), Database as a Service (DBaaS), or the like. Additionally, the cloud services provider system 102 may also provide application developers utilizing the client system 128 with tools for accelerated development, deployment, orchestration, and management of their application.

For example, the cloud services provider system 102 may be representative of various data centers of cloud computing services providers (e.g., Microsoft® Azure®, Amazon® Web Services® (AWS®), Google® Compute Engine™, Alibaba® AliCloud®, Digital Ocean®, Vultr®, Linode®, etc.), each implementing a variety of protocols (e.g., Hyper Text Transfer Protocol (HTTP), HTTP Secure (HTTPS), etc.), standard formats (e.g., Representational State Transfer (REST), JavaScript Object Notation (JSON), Extensible markup Language (XML), Remote Procedure Call (RPC), etc.), and/or APIs (e.g., Microsoft® Services Management APIs, Amazon® Elastic Compute Cloud® (EC2®) APIs, Google® Cloud Platform (Anthos®) APIs, etc.). Additionally or alternatively, in some embodiments, cloud services provider system 102 may be representative of data centers internal or external to a client system's 128 organization configured to provide cloud computing services.

In some embodiments, one or more systems within the cloud services provider system 102 may be geographically separated (e.g., separate physical locations, etc.) and virtually separated (e.g., separate network domains, etc.). In some embodiments, one or more systems within the cloud services provider system 102 may be substantially geographically co-located (e.g., in substantially the same physical location, etc.) and virtually connected (e.g., in the same network domain, etc.). Alternatively, in some embodiments, one or more systems within the cloud services provider system 102 may be geographically separated yet virtually connected or substantially geographically co-located yet virtually separated.

In one embodiment, the cloud services provider system 102 may include a scalable computing system 104. The scalable computing system 104 may be generally arranged to provide underlying hardware and/or software infrastructure for at least the cluster computing system 106, serverless computing system 110, and the collaborative communication system 114. The underlying hardware and/or infrastructure may typically include server devices, storage devices, networking devices, and virtualization services.

For example, the scalable computing system 104 be generally arranged to include a plurality of server devices, where each server device may be generally configured to execute at least one virtual machine. The scalable computing system 104 may be generally arranged to provision the at least one virtual machine to the plurality of server devices based at least on requests from the cloud services provider system 102 and/or client system 128. Each provisioned virtual machine may be further configured to include specialized applications, libraries, data, and/or configurations.

In one embodiment, the scalable computing system 104 may further include a cluster computing system 106 configured to execute a plurality of data analytics applications 108 for data analysis (e.g., machine learning, scientific simulations, data transformations, bioinformatics, financial analysis, etc.) of a client's data. In one embodiment, the cluster computing system 106 may be generally arranged to execute the plurality data analytics applications 108 on the underlying hardware and/or software infrastructure of the scalable computing system 104. In one embodiment, the plurality data analytics applications 108 may be generally configured with a distributed framework (e.g., Apache® Hadoop®, Apache® Spark®, etc.) to perform real-time and/or batch based parallel processing of clients' data which may be provided by the client system 128. It is to be appreciated that unlike the serverless computing system 110, the computing resources (e.g., virtual machines, master nodes, slave nodes, etc.) used by the cluster computing system 106, are typically managed by users of the client system 128.

In one embodiment, the cloud monitoring system 118 may be generally configured to notify a user of a client system 128, an application associated with the user of the client system 128, and/or a system within the cloud services provider system 102 regarding one or more monitored conditions that have occurred within the cloud services provider system 102. This in turn, would allow the user, the system, and/or the application receiving such notifications to take additional actions or perform additional operations based on the occurrence of the one or more monitored conditions. In one embodiment, the cloud monitoring system 118 may include, without limitation, one or more cloud monitoring applications 120.

In one embodiment, the cloud monitoring applications 120 may be generally configured to request, receive, and/or store metrics, logs, events generated by the hardware and/or software of the Cloud Services Provider System 102 (e.g., generated by scalable computing system 104, cluster computing system 106, serverless computing system 110, collaborative communication system 114, and cloud storage system 122, etc.). In one embodiment, the cloud monitoring applications 120 may be configured to analyze the received and/or stored metrics, logs, events and current date and time to determine whether one or more monitored conditions has occurred. In one embodiment, the monitored conditions may be configured by a user of the client system 128 or by an application associated with the user of the client system 128.

In one embodiment, the cloud monitoring applications 120 may be further configured to determine whether the monitored condition has occurred based on an analysis of the metrics, logs, events, current date and time, and the monitored condition. In one embodiment, the cloud monitoring system 118 may be further configured to generate the cloud monitoring notification based on a determination that the monitored condition has occurred. In an embodiment, the cloud monitoring system 118 may be configured to transmit the cloud monitoring notification to the client system 128, a system associated with the user of the client system 128, and/or an application associated with the user of the client system 128.

In one embodiment a monitored condition may include, without limitation, an elapsed period of time condition that would cause one or more cloud monitoring applications 120 to generate and transmit a cloud monitoring notification to users, systems, and/or applications on a periodic basis defined by an hours and minutes parameter. For example and assuming that the hours and minutes parameter is set for three hours, the cloud monitoring application 120 may be configured to generate and transmit a cloud monitoring notification to the serverless computing system 110 and a configurable resource monitor application 112, when the cloud monitoring application 120 determines that three hours have elapsed since the last time this condition has occurred. Thus, in this example, the cloud monitoring application 120 may be configured to generate and transmit a cloud monitoring notification to the configurable resource monitor application 112 every three hours for one or more days.

In another embodiment, a monitored condition may include, without limitation, a resource utilization condition. The condition may would cause at least one of the cloud monitoring applications 120 to generate and transmit a cloud monitoring notification to users, systems, and/or applications, when an amount of processing (e.g., processor utilization measured between 0 to 100 percent, etc.) that a computing resource (e.g., server devices, virtual machines, applications, etc.) is utilizing has matched a specific condition. In one embodiment, that specific condition may be defined by a threshold resource utilization parameter (e.g., 5% 10%, 15%, 50% etc.), a comparison parameter (e.g., greater than, less than, and/or equal to), a time period parameter (e.g., 30 minutes, 1 hour, 3 hours etc.), and a frequency of occurrence parameter (e.g., once, twice, etc.).

In one example, threshold resource utilization parameter is set for 5%, a comparison parameter is set for less than or equal to, a time period parameter is set for 30 minutes, and a frequency of occurrence parameter is set to twice. In this example, the cloud monitoring application 120 may be configured to generate and transmit a cloud monitoring notification to a serverless computing system 110 and the configurable resource monitor application 112, when the cloud monitoring application 120 determines that the processor utilization for a virtual machine has been less than 5% for a time period of 30 minutes at least twice.

In one embodiment, the collaborative communication system 114 may be generally configured to allow one or more users and/or teams of client system 128 of a business organization to collaborate between and among each other using synchronous and/or asynchronous conferencing via network 150. For example, synchronous conferencing may include substantially real-time text-based chat and/or substantially real-time audio and/or video based conferencing. For example, asynchronous conferencing may include bulletin board service (BBS), Internet forums, blogs, e-mails, shared calendars, listsery and news groups. In one embodiment, the collaborative communication system 114 may also include, without limitation, one or more collaborative communication server applications 116.

In one embodiment, the collaborative communication server applications 116 may be configured to establish one or more connections with one or more collaborative communication client application 132 via network 150. In one embodiment, the collaborative communication server applications 116 may be further configured to receive text data, audio data, and/or video data, from the one or more users via the corresponding collaborative communication client applications 132 and transmit the received text data, audio data, and video data to corresponding collaborative communication client applications 132 of other users via network 150.

For example, the collaborative communication server applications 116 may be configured to communicate in real-time between and among collaborative communication client applications 132 to allow real-time text-based chat and/or audio and/or video-based conferencing. Additionally, or alternatively, the collaborative communication server applications 116 may be configured to host a bulletin board service (BBS), Internet forums, blogs, e-mail server, shared calendar server to enable time flexible communications between one or more users of the collaborative communication client applications 132.

In one embodiment, the collaborative communication server applications 116 may be further configured to receive notifications from applications within the cloud services provider system 102. In one embodiment, the collaborative communication server applications 116 may be configured to transmit the received notification, to one or more users via the collaborative communication client applications 132. For example, the collaborative communication server applications 116 may also be configured to receive resource notification messages from the configurable resource monitor application 112 and transmit the received resource notification messages to one or more users of the client system 128 via the collaborative communication client applications 132.

In one embodiment, the collaborative communication server applications 116 may also be configured to include hierarchical organizational structure (e.g., corporate structure, governmental structure, military command structure, etc.) for one or more organizations (e.g., businesses, corporations, governments, militaries, etc.) that the one or more users using the collaborative communication client applications 132 may be associated with. For a particular organization, the collaborative communication server applications 116 may be configured to host one or more collaborative communication channels where a group or team of the one or more users that are associated with that particular organization may join the one or more collaborative communication channels in accordance with the hierarchical organizational structure.

For example, the collaborative communication server applications 116 may be configured to allow a team of software engineers that are part of a business unit of a corporation to join a software development communication channel. Continuing with this example, the software development communication channel may be dedicated to the discussion of issues related to development of business software for the corporation. Similarly, the collaborative communication server applications 116 may also be configured to allow one or more managers that manage the business unit of a team of software engineers to join a development management communication channel. Continuing with this example, the development management communication channel may be dedicated to the discussion of issues related to the management of the software engineers. It is to be appreciated that actual implementation may not limited to these examples.

In one embodiment, the collaborative communication server applications 116 may be further configured to send and/or receive one or more messages from system and/or applications within the cloud services provider system 102. Moreover, the collaborative communication server applications 116 may be configured to send and/or receive direct messages from one user to another user via their respective collaborative communication client applications 132. Additionally, the collaborative communication server applications 116 may be further configured to send and/or receive messages from one user to a group or subset of one or more users and/or to all users in a collaborative communication channel via their respective collaborative communication client applications 132. Furthermore, the collaborative communication server applications 116 may be further configured to allow users using their respective collaborative communication client applications 132 to notify one or more users using mentions or tags in one or more messages within one or more collaborative communication channels.

In one embodiment, the collaborative communication server applications 116 may receive the one or more messages from one or more applications of the cloud services provider system 102 via one or more communication protocols. In one embodiment, the communication protocol may include, without limitation, a HTTP callback or webhook identified by a callback URL associated with one or more users and/or teams of the collaborative communication client applications 132. For example, a message may be received by the collaborative communication server applications 116 via an HTTP POST request for a specific URL associated with one or more users of the collaborative communication client applications 132. In one embodiment, the collaborative communication server applications 116 may be configured to transmit the received message to one or more users via the collaborative communication client applications 132.

In one embodiment, the collaborative communication server application 116 may also be configured to send the one or more messages to applications of the collaborative communication server applications 116 via the one or more communication protocols. In one embodiment, the one or more communication protocols may include, without limitation, a HTTP callback or webhook identified by a callback URL associated with one or more applications of the collaborative communication server applications 116.

In one embodiment, the collaborative communication server applications 116 may be further configured to facilitate execution of one or more commands in the cluster computing system 106. In one embodiment, the collaborative communication server applications 116 may be configured to receive one or more command execution messages from the collaborative communication client applications 132. In one embodiment, the collaborative communication server applications 116 may be further configured to generate and transmit one or more command execution requests to the cluster computing system 106 based on the received commands.

In one embodiment, the collaborative communication server applications 116 may also be configured to receive user status requests for one or more users identified in the user status requests. In response, the collaborative communication server applications 116 may also be configured to transmit a corresponding user status response that include a user status for each user identified in a user status request. In one embodiment, the user status may include, without limitation, active status indicating that a user is actively using their associated client device (e.g., client device 130-1), away status indicating that they are not available (e.g., on vacation, etc.), do not disturb status indicating that they do not wish to be disturbed (e.g., in a meeting, etc.).

To assist in determining a user status of a user, the collaborative communication client application 132 executing on a user's client device (e.g., client device 130-1) may be configured to automatically monitor a user's client device and determine whether a user is interacting (e.g., actively using a web browser, actively using a word processing application, etc.) with their client device. For example, the collaborative communication client application 132 may determine that a user status for a user is in the active status if the user is actively using their client device to browse the Internet. Alternatively, the collaborative communication client application 132 may determine that the user status of the user is in the away status if a user's client device received no input (e.g., keyboard and mouse input, etc.) for a specific idle period (e.g., 30 minutes, 1 hour, etc.)

Additionally or alternatively, the collaborative communication client application 132 may be configured to automatically monitor a user's calendar (e.g., Microsoft® Outlook® Calendar, Google® Calendar, Calendar associated with collaborative communication server applications 116, etc.) and set a user status for a user based at least on the user's calendar. For example, the collaborative communication client application 132 may automatically set a user's user status to away status during a specific time period if the user's calendar indicates that the user is away and on vacation during that specific time period. In another example, the collaborative communication client application 132 may automatically set a user's user status to do not disturb status at a specific time period if the user's calendar indicates that the user is in a meeting that specific time period. It can be appreciated that the examples are not limited in these contexts.

Additionally or alternatively, the collaborative communication client application 132 may be configured to allow a user to manually set their user status using a graphical user interface element (not shown) associated with the collaborative communication client application 132. For example, a user may use the collaborative communication client application 132 executing on their client device (e.g., client device 130-1) to set their user status to do not disturb status. In one embodiment, a manually set user status may override any user status automatically determined by the collaborative communication client application 132.

In one embodiment, the cloud storage system 122 may be generally configured transmit, receive, and/or store associated with the cloud services provider system 102 and client system 128 as data containers in a tiered file system and/or as objects in an object storage. In an embodiment, the cloud storage system 122 may include, without limitation, one or more cloud storage applications 124 and one or more distributed cloud datastores 126. In one embodiment, the one or more cloud storage applications 124 may be configured to store metrics, logs, events received from the one or more systems and applications within the cloud services provider system 102 and from the client system 128.

In one embodiment, the one or more cloud storage applications 124 may be configured to store data (e.g., machine learning training data for machine learning algorithms, scientific data for scientific simulations, financial data for financial analysis, configuration data for configuring applications, etc.) associated with a user of the client system 128 or an application of client system 128 in one or more distributed cloud datastores 126. In one embodiment, to facilitate the storage and retrieval of data, the one or more cloud storage applications 124 may be configured to receive cloud storage requests to store data within the one or more cloud datastores 126. In one embodiment, to facilitate the retrieval of data, the one or more cloud storage applications 124 may be configured to receive cloud retrieval requests from systems and/or applications to retrieve data stored within the one or more cloud datastores 126. In response the cloud retrieval requests, the one or more cloud storage applications 124 may be further configured to transmit cloud retrieval responses with the requested data to the systems and/or applications based on the received cloud retrieval requests.

In one embodiment, the client system 128 may be representative of computing systems within a business organization utilizing services provided by the cloud services provider system 102. In one embodiment, the client system 128 may include, without limitation, one or more client devices 130 that may be used by one or more users and/or teams of a business organization utilizing the services of the cloud services provider system 102. For example, one or more users and/or teams of the one or more client devices 130 may request execution of data analytics applications 108 in a cluster computing system 106 to perform data analysis on client's data stored within the distributed cloud datastores 126. In another example, one or more users and/or teams of the one or more client devices 130 may configure the cloud monitoring applications 120 to monitor the cluster computing system 106 for an occurrence of a monitored condition and notify the serverless computing system 110 and the configurable resource monitor application 112 regarding the occurrence of the monitored condition.

In one embodiment, the client devices 130 may further include, without limitation, collaborative communication client applications 132. In one embodiment, the collaborative communication client applications 132 may be configured to communicate with the collaborative communication server applications 116 and allow one or more users and/or teams to collaborate between and among each other using synchronous and/or asynchronous conferencing via network 150. In one embodiment, the collaborative communication client applications 132 may be further configured to receive notifications for one or more users from the collaborative communication server applications 116. In one embodiment, the collaborative communication client applications 132 may be configured to receive resource notification messages from the collaborative communication server applications 116.

In one embodiment, the serverless computing system 110 may be generally configured to provide provisioning and execution of one or more serverless applications based on notifications received from one or more systems and/or applications of the cloud services provider system 102 and/or client system 128. It can be appreciated that unlike cluster computing system 106, users of the client system 128 typically are not responsible for the management of the supporting computing resources that may be used by the serverless computing system 110 to execute the one or more serverless applications.

In one embodiment, to facilitate monitoring of long-standing or idle computing resources, the one or more serverless applications executed by the serverless computing system 110 may include, without limitation, a configurable resource monitor application 112. In one embodiment, the configurable resource monitor application 112 may be configured as a serverless application, which may include a monitor component specifically configured to receive and process one or more notifications received by the serverless computing system 110.

In one embodiment, the configurable resource monitor application 112 may be configured to receive a cloud monitoring notification, which may indicate an occurrence of a monitored condition. In response to the cloud monitoring notification, the configurable resource monitor application 112 may be further configured to scan the cluster computing system 106 for at least one computing resource having a client assigned computing resource identifier and at least one computing resource attribute based on a resource identifier scan parameter and at least one resource attribute scan parameter.

In one embodiment, after scanning the cluster computing system 106, the configurable resource monitor application 112 may be configured to generate a resource notification request based on the scan of the cluster computing system 106 and transmit the resource notification request to a collaborative communication system 114. Additionally, the configurable resource monitor application 112 may be configured to dynamically select a user and/or associated collaborative communication channel to receive a resource notification message of the resource notification request that is most likely to take immediate action when notified regarding any long-standing or idle computing resources.

In one embodiment, the resource notification request may be configured to notify in a resource notification message the selected one or more users and/or associated collaborative communication channels that one or more computing resources with computing resource attributes that matches the resource attribute scan parameter has been identified. For example, the resource notification request may notify one or more users and/or collaborative communication channels that a computing cluster having a particular client assigned computing resource identifier with an elapsed time of creation greater than 5 hours has been identified. Additionally, the resource notification request may also be posted in a collaborative communication channel and configured to mention or tag one or additional users.

In one embodiment, the configurable resource monitor application 112 may also be configured to receive one or more command execution requests from one or more users via the collaborative communication server applications 116 to terminate one or more long-standing or idle computing resources. In one embodiment, after transmitting a resource notification request and a period of time has elapsed without receiving any command execution requests, the configurable resource monitor application 112 may be further configured to dynamically select one or more additional users and/or associated collaborative communication channels and notify the one or more additional users and/or collaborative communication channels. These and additional embodiments of the configurable resource monitor application 112 will be further discussed in detail with respect to FIG. 3.

Figure 2A:
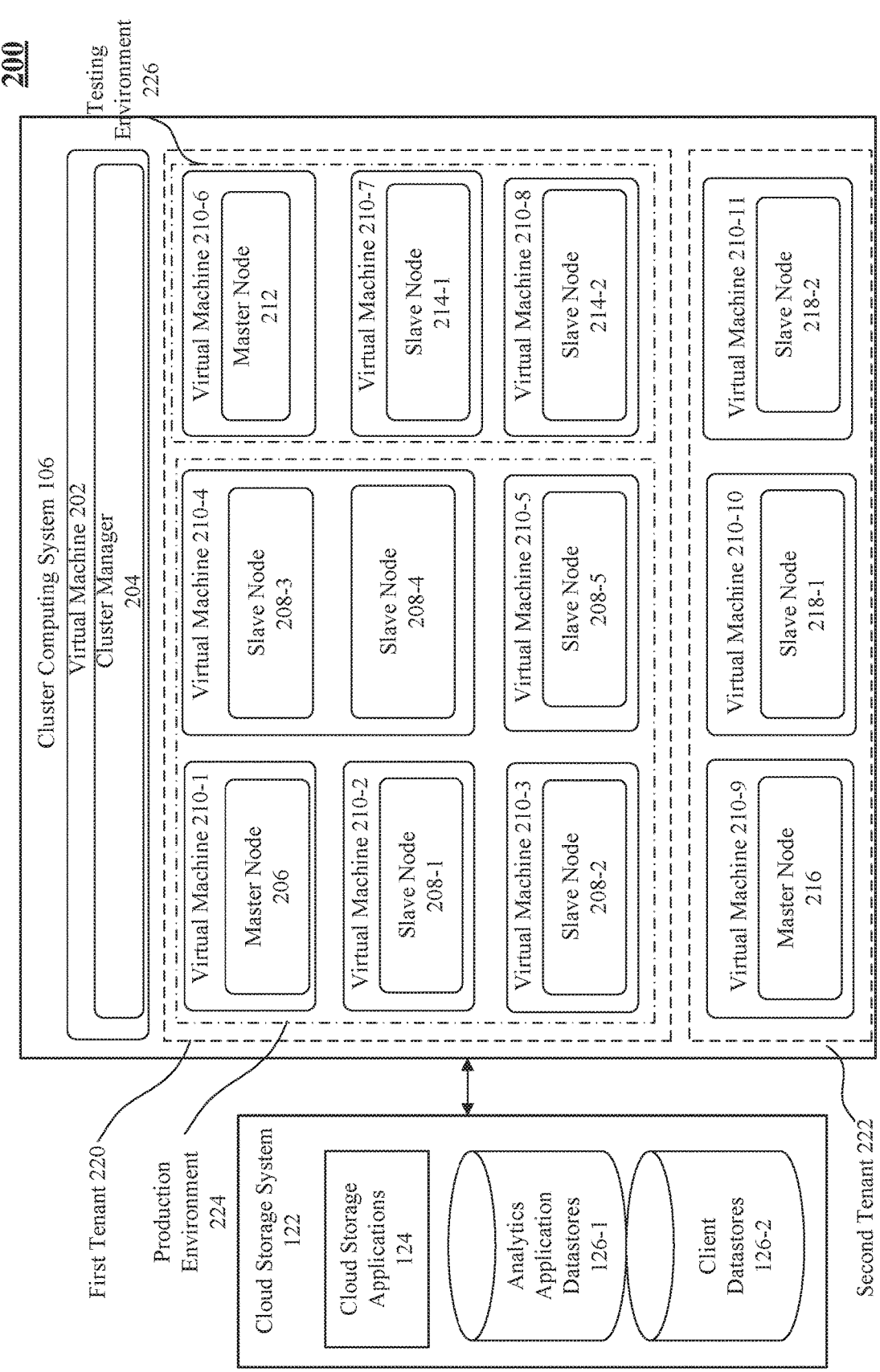
FIG. 2A illustrates a cluster computing system operatively coupled to a cloud storage system for performing data analytics according to an example embodiment.

FIG. 2A illustrates a cluster computing system 106 operatively coupled to the cloud storage system 122 for performing data analytics according to an example embodiment.

In one embodiment, the cloud storage system 122 may further include, without limitation, the data analytics application datastores 126-1 and the client datastores 126-2. Some examples of data stores may include distributed datastores, which may be on-premises or off-premises storage instances, StaaS instances, cloud-based block storage, or cloud-based object storage, for example, including Amazon® Simple Storage Service (S3), Microsoft® Azure® Storage, Minio® Object Storage, IBM® Bluemix® Object Storage, IBM® Cleversafe® Object Storage, Cloudian® HyperStore® or HyperFile®, or the like. In one embodiment, the data analytics application datastores 126-1 may be configured to store one or more data analytics applications 108 for provisioning by the cluster manager 204. For example, the data analytics application datastores 126-1 may be configured as a container registry for storing data analytics applications 108 as container application images. In one embodiment, the client datastores 126-2 may store client's data for data analysis by the one or more data analytics applications 108. It can be appreciated that while the data analytics applications 108 are not illustrated in FIG. 2A, a computing cluster comprising at least one master node (e.g., master node 206) and at least one slave node (e.g., slave nodes 208-1, 208-2, 208-3, 208-4, 208-5) may represent an execution of a data analytics application in the cluster computing system 106 as further discussed below.

In one embodiment, the cluster computing system 106 may include, without limitation, a plurality of cluster nodes (e.g., master nodes 206, 212, 216, slave nodes, 208, 214, 218, etc.) configured to operate as one or more computing clusters. In one embodiment, the cluster computing system 106 may include at least one master node (e.g., master node 206) and at least one slave node (e.g., slave nodes 208-1, 208-2, 208-3, 208-4, 208-5) configured to operate in a master-slave configuration in order to perform data analysis of a client's data (e.g., machine learning training data for machine learning algorithms, scientific data for scientific simulations, financial data for financial analysis, etc.) stored in the client datastores 126-2. In such configurations, the combination of at least one master node and at least one slave node operating in a master-slave configuration may represent a computing cluster executing a data analytics application in a distributed fashion.

In one embodiment, and to facilitate the operation of a computing cluster, the one or more master nodes (e.g., master node 206, etc.) may be generally configured to manage (e.g., request, terminate, etc.) the execution of computing tasks by one or more slave nodes (e.g., slave node 214-1, 214-2, etc.). The one or more master nodes (e.g., master node 206, etc.) may also be configured to monitor the operational status of the execution of computing tasks by one or more slave nodes (e.g., slave node 214-1, 214-2, etc.) and may transmit the operational status to the cluster manager 204. The one or more slave nodes may be configured to execute one or more computing tasks on the respective virtual machines (e.g., virtual machines 210-6, 210-7, 210-8, etc.) in parallel. In an embodiment, the computing tasks may include, without limitation, map and reduce tasks, machine learning (ML) tasks (e.g., ML classification tasks, ML clustering, ML regression, ML image classification, ML object recognition tasks), statistical analysis tasks (e.g., distributed R and SAS, etc.), financial analysis tasks, and/or the like. These computing tasks may also be performed on the client's data stored in the client datastores 126-2.

For example, and with respect to a first computing cluster, the master node 206 may be configured to schedule and distribute one or more financial analysis tasks to slave nodes 208-1, 208-2, 208-3, 208-4, and 208-5 for execution in parallel. In another example and with respect to a second computing cluster, the master node 212 may be configured to schedule and distribute one or more map and reduce tasks to slave nodes 214-1 and 214-2 for execution in parallel on client's data stored in the client data stores 126-2. In a further example, the master node 216 may be configured to schedule and distribute ML clustering tasks to slave nodes 218-1 and 218-2 for execution in parallel on client's data stored in the client data stores 126-2.

In one embodiment, and to execute the one or more data analytics applications 108, the cluster computing system 106 may include one or more virtual machines 202 and 210. In one embodiment, the amount of computing resources (e.g., virtual processors, RAM, maximum network bandwidth, maximum storage, maximum storage bandwidth, etc.) available for each virtual machine may vary based on associated virtual machine (VM) configuration parameters and the underlying hardware that hosts a virtual machine.

For example, the VM configuration parameters may define optimization(s) of the virtual machine (e.g., optimized for general-purpose computing, optimized for accelerated computing, optimized for memory intensive computing, etc.) number of virtual processors (e.g., 1, 2, 4, 6, 8, 16, 24, 32, 64, 128, etc.) available to one or more virtual machines, overall processing bandwidth of one or more virtual machines (e.g., cumulative cycles per second, floating-point operations per second (FLOPS), etc.), the amount of RAM available to the virtual machine(s) (e.g., 16 GB, 32, GB, 64, GB, 128 GB, etc.), maximum network bandwidth available to the virtual machine(s) (e.g., 1, Gbps, 10 Gbps, etc.), amount of storage available to the virtual machine(s) (6 TB, 12, TB, etc.), maximum storage bandwidth available to the virtual machine(s) (e.g., 3,500 Mbps, 7,000 Mbps, 14,000 Mbps, etc.), operating system(s) of the virtual machine(s) (e.g., Microsoft® Windows® Server, Canonical® Ubuntu® Server, Debian® Linux®, CentOS® Linux®, IBM® Red Hat® Linux®, CoreOS® Container Linux® (rkt), etc.), geographic region of the virtual machine (e.g., Northern Virginia, Ohio, Northern California, Montreal, Ireland, Frankfurt, Singapore, etc.), and/or the like.

In one embodiment, and to manage one or more computing clusters executing on one or more virtual machines 210, virtual machine 202 may be associated with and managed by a cloud computing services provider of the cloud services provider system 102. The virtual machine 202 may include, without limitation, a cluster manager 204, which may also be managed by the cloud computing services provider. In one embodiment, the cluster manager 204 may be configured to establish communication sessions with one or more systems and applications to perform one or more management operations with one or more computing clusters as further discussed below.

In one embodiment, the cluster manager 204 may be generally configured to provision a data analytics application stored in the analytics application datastores 126-1 as one or more computing clusters for execution on the one or more virtual machines 210. In one embodiment, the cluster manager 204 may be configured to provision the data analytics application based on one or more cluster provisioning requests received from one or more systems and/or applications via the established communication session. Each provisioned computing cluster may be identified by a cloud computing cluster identifier, which may be a unique alphanumeric identifier among all other computing clusters and may be assigned by the cloud computing services provider of cloud services provider system 102. In one embodiment, the cluster manager 204 may include a combination of hardware (e.g., physical processors, memory, application specific integrated circuit (ASIC), field programmable gate array (FPGA)) and/or executable software (e.g., executable code, interpreted code, managed code, library code, etc.).

In one embodiment, the cluster provisioning requests may include one or more cluster creation parameters. The one or more cluster creation parameters, may include, without limitation, the size of the computing cluster (e.g., a number nodes), the type of data analytics application to execute (e.g., Apache® Hadoop®, Sector Alliance™ Sector/Sphere™, Zvents® Hypertable, Apache® Spark®, etc.), and the one or more virtual machine configuration parameters (e.g., number of virtual processors, amount of RAM, amount of storage, amount of network bandwidth, etc.). To further assist client system 128 in identifying one or more computing clusters, the one or more cluster creation parameters may further include, without limitation, a client assigned computing resource identifier and client assigned computing resource name. The client assigned computing resource identifier may be a unique alpha numeric identifier and may identify one or more computing resources used by one or more users and/or teams of the client system 128. The client assigned computing resource name may provide a descriptive name for the one or more computing resources.

For example, a cluster provisioning request to provision the first computing cluster may specify a first client assigned computing resource identifier to be assigned to the first computing cluster (e.g., master node 206 and slave nodes 208-1, 208-2, 208-3, 208-4, 208-5, etc.) and a first client assigned computing resource name also to be assigned to the first computing cluster. Similarly, a cluster provisioning request to provision the second computing cluster may specify a second client assigned computing resource identifier to be assigned to the second computing cluster (e.g., master node 212 and slave nodes 214-1, 214-2, etc.) and specify a second client assigned computing resource name also to be assigned to the first computing cluster.

In one embodiment, and continuing with the above example, the first client assigned computing resource identifier and the second client assigned computing resource identifier may be the same when the same user or team of the client system 128 are responsible for both the first and second computing clusters or different if first and second computing clusters may be managed by different users or teams of the client system 128. In one embodiment, the first client assigned computing resource name and the second client assigned computing resource name may also be the same or different depending on circumstances and implementation.

In one embodiment, the cluster manager 204 may also be configured to maintain, determine, and provide operational status of the one or more computing clusters. In one embodiment, and to provide operational status, the cluster manager 204 may also be configured to receive one or more resource search requests to identify one or more computing resources of the cluster computing system 106 associated with a user and/team of a client system 128. In one embodiment, the cluster manager 204 may be configured to transmit a resource search response identifying one or more computing resources to one or more systems and/or applications based on the received resource search request and resource attribute scan parameters. Some implementations of cluster manager 204 may include a message-passing interface (MPI) or equivalent, distributed interprocess communication (DIPC) protocol, single-system image (SSI) architecture, virtual-kernel architecture, load balancer, distributed manager for storage or memory in clustered computing applications, and/or other cluster middleware, according to some embodiments. Further examples of cluster manager 204 may include Slurm™ Workload Manager, OpenSSI, LinuxPMI/openMosix, Kerrighed™, gLite™, Apache® Mesos®, Apache® Spark® framework, or the like, which may include executable code, interpreted code, managed code, library code, etc., as described further below.

In one embodiment, and to ensure there are adequate computing resources allocated during provisioning of one or more computing clusters, the cluster manager 204 may be configured to transmit one or more virtual machine (VM) provisioning request to the scalable computing system 104. The VM provisioning request may request the scalable computing system 104 to provision one or more virtual machines 210 based on the one or more cluster provisioning requests. The cluster manager 204 may be further configured to terminate the execution of one or more computing clusters based on a cloud computing command request received from one or more systems and/or applications via an established communication session. Additionally, and based on the cloud computing command request, the cluster manager 204 may also generate and transmit one or more VM termination requests to the VM manager 284 to request one or more virtual machines that are no longer used any master node or slave node of a computing cluster.

In one embodiment, and to reduce possibilities of cross contamination between a client's data and its computing resources used during testing or quality assurance versus the client's data and its computing resources used during production, the one or more cluster creation parameters may further include, without limitation, a client assigned environment identifier that identifies the development environment associated with the computing cluster used by the client system 128. In one embodiment, the client assigned environment identifier may identify whether a computing cluster used by the client system 128 is part of a testing environment 226 or a production environment 224.

For example, and with respect to the first computing cluster as previously discussed, the first computing cluster, which includes the master node 206 and slave nodes 208-1, 208-2, 208-3, 208-4, and 208-5, may be identified as being part of the production environment 224. In another example, and with respect to the second computing cluster as previously discussed, the second computing cluster, which includes the master node 212 and slave nodes 214-1 and 214-2, may be identified as being part of the testing environment 224.

In one embodiment, the cloud services provider system 102 may be configured to operate utilizing a multi-tenant architecture. In one embodiment, one or more the computing resources (e.g., computing clusters, virtual machines, virtual processors, RAM, local storage, etc.) of the cluster computing system 106 may be shared between multiple tenants. In one example, cluster computing system 106 may be divided between a first tenant 220 that is utilized by users of client system 128 and a second tenant 222 that is utilized by different users of different client system 128 (not shown), where at least some of the underlying hardware and/or software may be shared (e.g., sharing of physical server devices, sharing of a physical processor with multiple physical cores, sharing total RAM, etc.). It can be appreciated, however, that despite sharing one or more computing resources, a tenant's or a client's data stored in client datastores 126-1 is typically isolated from other tenants or clients.

Figure 2B:
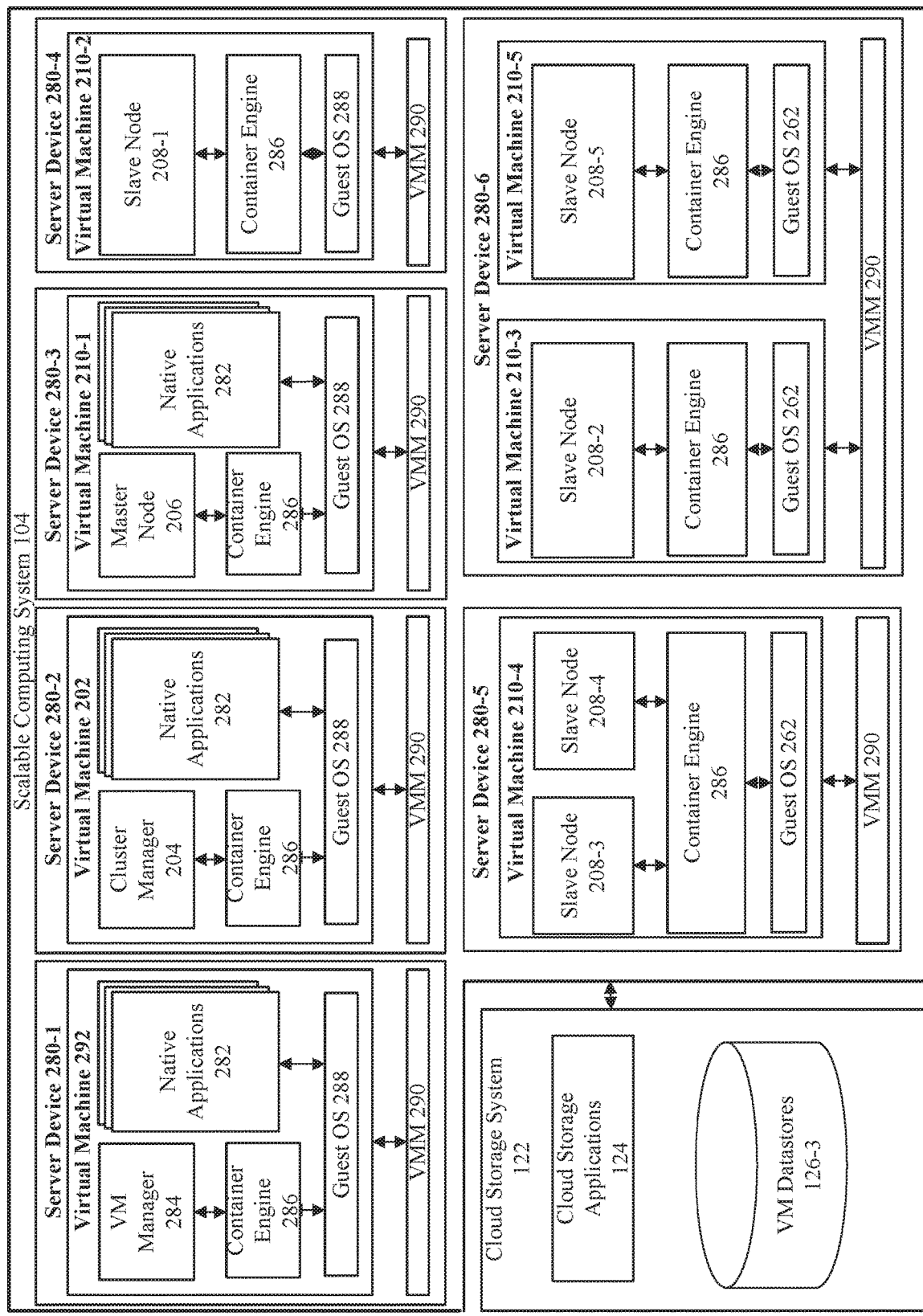
FIG. 2B illustrates server devices of a scalable computing system configured to host one or more virtual machines according to an example embodiment.

FIG. 2B illustrates server devices 280 of the scalable computing system 106 configured to host one or more virtual machines 292, 202, and 210 according to an example embodiment.

As previously illustrated and discussed in FIG. 2A, one or more master nodes and slave nodes of one or more computing clusters may be provisioned to one or more virtual machines 210 for execution. Also previously illustrated in FIG. 2A, the cluster manager 204, which may be configured to provision one or more master nodes and slave nodes to the virtual machines 210, may itself be hosted in a virtual machine (e.g., virtual machine 202). In one embodiment, the cloud storage system 122 may further include, without limitation, virtual machine (VM) datastores 126-3 configured to store virtual machine images with associated virtual machine configuration parameters.

In one embodiment, to provide virtual machines 202 and 210 with physical hardware for execution of their applications, the scalable computing system 104 may include, without limitation, one or more server devices 280. In one embodiment, each of the server devices 280 of the scalable computing system 104 may also vary based on their available computing resources (e.g., number of physical processors, amount of RAM, maximum amount of storage, maximum amount of network bandwidth, etc.). For example, one or more server devices 280 may be configured for specific hardware optimizations (e.g., optimized for general purpose computing, optimized for accelerated computing, optimized for memory intensive computing, etc.) and may vary by number of physical processors (e.g., 1, 2, 4, 6, 8, 16, 24, 32, 64, 128, etc.), overall processing bandwidth of one or more processors (e.g., cumulative cycles per second, floating-point operations per second (FLOPS), etc.), the amount of installed RAM (e.g., 16 GB, 32, GB, 64, GB, 128 GB, etc.), vary by the maximum network bandwidth available (e.g., 1, Gbps, 10 Gbps, etc.), the amount of storage installed (6 TB, 12, TB, etc.), the maximum storage bandwidth available (e.g., 3,500 Mbps, 7,000 Mbps, 14,000 Mbps, etc.), and/or the like.

In one embodiment, the server devices 280 may be geographically separated (e.g., separate physical locations, etc.) and virtually separated (e.g., separate network domains, etc.). In other embodiments, the server devices 280 may be substantially geographically co-located (e.g., in substantially the same physical location, etc.) and virtually connected (e.g., in the same network domain, etc.). Alternatively, in some embodiments, the server devices 280 may be geographically separated yet virtually connected or substantially geographically co-located yet virtually separated. For example, the server device 280-1 may be physically located in one geographic region separate from the server device 280-2, 280-3, 280-4, 280-5, and 280-6, yet virtually connected. In one embodiment, the availability of server devices 280 and their associated computing resources may vary based on the geographic region. For example, availability of server devices 280 configured to handle memory-intensive computing with 64 physical processors and 128 GB of RAM may be limited in Northern Virginia and as compared to Northern California. Other performance measures, including latency and cost, may also be considered.

In one embodiment, each of the server devices 280 of the scalable computing system 104 may be configured to include, without limitation, a hypervisor or virtual machine monitor (VMM) (e.g., VMM 290 of server device 280-1). In one embodiment, the VMMs 290 may be configured to execute directly on the server devices (e.g., server devices 280) and manage the concurrent execution of one or more virtual machines 292, 202, and 210 (e.g., virtual machine 210-3 virtual 210-5 of server device 280-6). For example, VMM 290 of server device 280-1 may be representative of a native or bare-metal hypervisor (e.g., VMware® ESXi™ hypervisor, Microsoft® Hyper-V® hypervisor, KVM hypervisor, Proxmox™ VE hypervisor, Citrix® XenServer® Xen™ hypervisor, etc.) configured to execute and/or manage one or more instances of virtual machines 292, 202, and/or 210, for example. Additionally, or alternatively, hosted VMMs may be run on a native host operating system. With sufficient hardware virtualization support (e.g., AMD® AMD-V, AMD-Vi, AMD-RVI; Intel® VT-x, VT-i, VT-d; ARM® Virtualization Extensions, System Memory Management Unit (SMMU), TrustZone®; Samsung® Exynos® SysMMU; Sun® Input-Output Memory Management Unit (IOMMU); other IOMMU, SMMU, or equivalent virtualization-extensions architecture, etc.) underlying the host operating system, hosted VMMs may run one or more virtual machines 292, 202, and/or 210 with native or near-native performance. Examples of hosted VMMs include VMware® Server, Oracle® VirtualBox®, Oracle® Virtual Iron™, BSD® Hypervisor (bhyve™), QEMU™, etc.

In one embodiment, the one or more virtual machines 292, 202, and 210 may include, without limitation, a guest operating system (OS) 288 (e.g., Microsoft® Windows® Server, Canonical® Ubuntu® Server, Debian® Linux®, CentOS® Linux®, IBM® Red Hat® Linux®, CoreOS® Container Linux®, Intel® Clear Linux®, Microsoft® Azure® Sphere®, etc.). In one embodiment, each guest OS may be generally configured to execute one or more native applications 282 and one or more container engines 286 (e.g., Docker® Engine, rkt, LXC™ (including Anbox™), Oracle® Solaris® Zones, FreeBSD® Jails, Linux® cgroups, IBM® AIX® Workload Partitions, Virtuozzo® OpenVZ®, etc.). Containers may refer generically to any software-level or OS-level virtualization or paravirtualization, in some embodiments. In one embodiment, the native applications 282 of may be configured to assist in the execution of the master nodes and/or slave nodes in container engines 286 of the one or more guest OS 288. In some embodiments, master and/or slave nodes may form a part of a distributed software and/or storage framework, such as Apache® Hadoop®, Amazon® Elastic MapReduce, or similar software ecosystems that may be based at least in part on a MapReduce programming model, and that may be hosted in at least one virtual machine, such as virtual machines 210-1 through 210-5, for example. In one embodiment, the native applications 282 may also share a common execution environment with a container engine in a guest OS 288.

In one embodiment, each of the one or more container engines 286 may be configured to host and manage the execution of one or more container applications such as, the cluster manager 204, one or more master nodes (e.g., master node 206 hosted of virtual machine 210-1), and/or one or more slave nodes (e.g., slave nodes 208-3 and 208-4 of virtual machine 210-4). It is to be appreciated that in some implementations, the one or more master nodes and slave nodes may be executed by the container engine 286 in one or more container instances, where each container instance (not shown) may execute the master nodes and/or slave nodes in its own isolated runtime environment. Thus, each container instance may include, without limitation, a container operating system (OS), one or more container applications associated with the master nodes and/or slave nodes, and associated container components (e.g., executable binaries, support libraries, etc.) to support the execution of the master nodes and slave nodes.

In one embodiment, and to assist in the management of one or more virtual machines 210 executing on one or more server devices 280 (e.g., server devices 280-3, 280-4, 280-5, 280-6, etc.), the server device 280-1 may include virtual machine 292 may be managed by the cloud computing services provider of the cloud services provider system 102. In one embodiment, the virtual machine 292 may include a virtual machine (VM) manager 284 configured to provision virtual machines based on one or more virtual machine (VM) provisioning requests received from one or more systems and/or applications (e.g., client manager 204, serverless manager 232, etc.). In one embodiment, a VM provisioning request may include one or more VM provisioning parameters. The one or more VM provisioning parameters may include, without limitation, a number of virtual machines to provision and the VM configuration parameters as previously discussed with respect to FIG. 2A for each virtual machine.

In one embodiment, and in response to the VM provisioning request, the VM manager 284 may be configured to identify one or more server devices 280 with available computing resources that can match or otherwise satisfy the VM provisioning request. After identifying one or more available server devices 280, the VM manager 284 may be further configured to provision one or more virtual machines 210 having the VM configuration parameters specified in the VM provision request to the available one or more available server devices 280. Each of the provisioned virtual machines 210 may be identified by a cloud VM identifier, which may be a unique alphanumeric identifier among all other cloud VM identifiers and may be assigned by the cloud computing services provider of cloud services provider system 102.

For example, and to provision the one or more virtual machines 210, the VM manager 284 may identify and/or configure one or more VM images stored in the VM datastores 126-3 with the specified VM configuration parameters. Continuing with the example, the VM manager 284 may further transmit or cause the transmission of the identified and/or configured one or more VM images to VMMs 290 of the identified one or more server devices 280 with available computing resources. It is to be appreciated that each of the identified and/or configured VM images may be appropriately matched with the computing resources available of the identified one or more server devices 280. Continuing with the example, the VM manager 284 may then configure and/or request the execution of the VM images on the identified one or more server devices 280 by the respective VMMs 290.

In one embodiment, the VM manager 284 may be further configured to transmit a VM provisioning response to each of the systems and/or applications that transmitted a VM provisioning request. The VM provisioning response may include, without limitation, one or more cloud VM identifiers assigned to each provisioned virtual machine. In one embodiment, the VM manager 284 may also be configured to receive VM termination requests from the one or more systems and/or applications, which may include the one or more cloud VM identifiers. Thus, the cloud VM identifiers may be used by the systems and/or applications to terminate a previously provisioned virtual machines so as to free up any computing resources (e.g., physical processors, RAM, of the server devices) used by the identified virtual machines to be terminated. In one embodiment, the VM manager 284 may include a combination of hardware (e.g., physical processors, memory, application specific integrated circuit (ASIC), field programmable gate array (FPGA)) and/or executable software (e.g., executable code, interpreted code, managed code, library code, etc.)

Examples of VM manager 284 may include Apache® CloudStack®, IBM® Red Hat® Virtual Machine Manager (virt-manager)™, IBM® Red Hat® libvirt™, Kimchi Project™ Kimchi, TotalCloud®, Citrix® GoTo Cloud Services®, etc. Additionally or alternatively, software for orchestration of containers or virtual machines may fulfill the role of VM manager 284. Further examples of VM manager 284 in an orchestration role may include Spotinst™ Elastigroup™, Google® Kubernetes®, Google® Ganeti®, IBM® Red Hat® oVirt®, Proxmox™ Virtual Environment (VE), OpenQRM™, Microsoft® System Center Virtual Machine Manager (SCVMM), IBM® Red Hat® OpenShift®, Amazon® Elastic Container Service (ECS), etc.

Figure 2C:
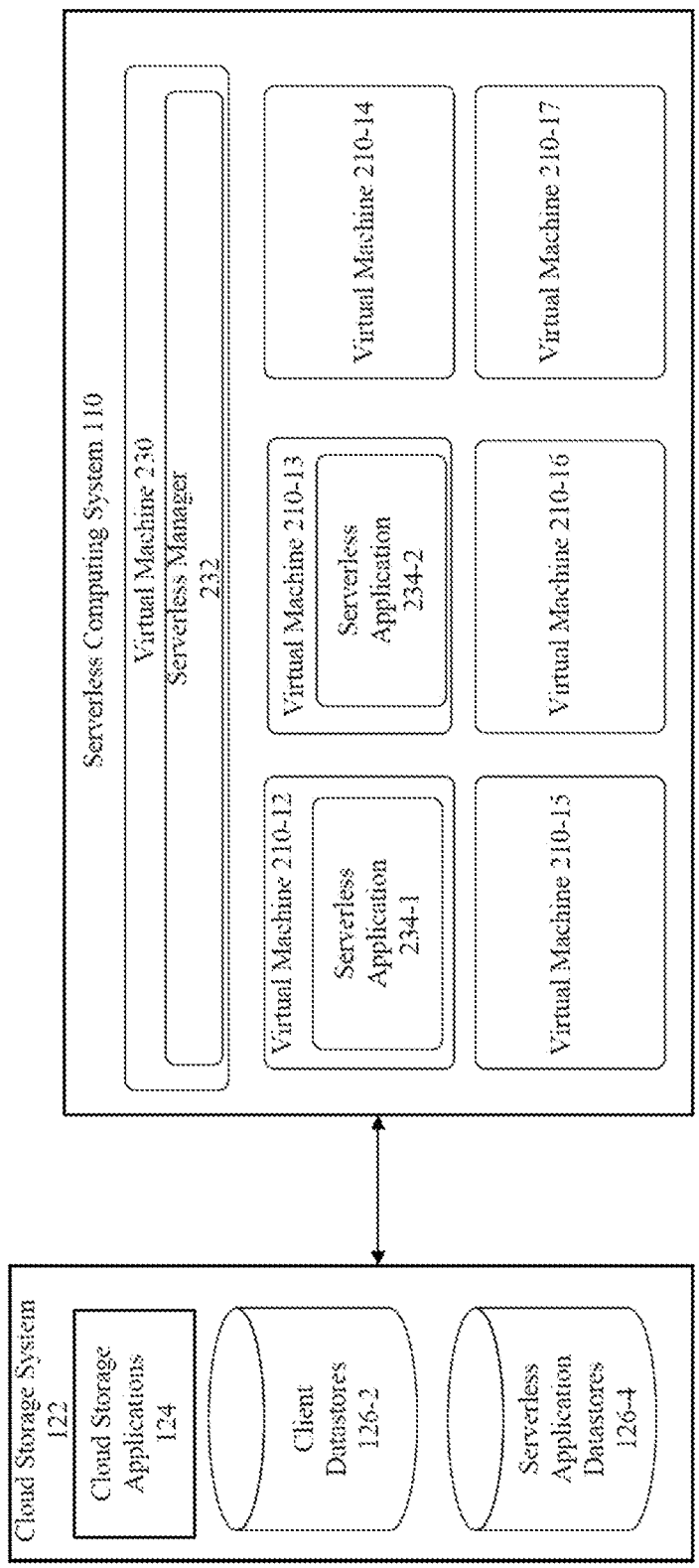
FIG. 2C illustrates the components of a serverless computing system according to an example embodiment.

FIG. 2C illustrates a serverless computing system 110 operatively coupled to the cloud storage system 122 for monitoring long-standing resources according to an example embodiment.

In one embodiment, the cloud storage system 122 may further include, without limitation, the data analytics application datastores 126-1 and the client datastores 126-2 and serverless application datastores 126-4. In one embodiment, client datastores 126-2 may be further configured to store configuration information for configuring the operations of the configurable resource monitor application 112. In one embodiment, the serverless application datastores 126 may be further configured to store one or more serverless applications 234. The serverless applications 234 may include, without limitation, configurable resource monitor application. Each serverless application may be configured with at least one monitor component specifically configured to receive and process one or more notifications (e.g., cloud monitoring notifications, etc.) received by the serverless computing system 110.

In one embodiment, and to assist in the management and communication of one or more serverless applications 234 executing on one or more virtual machines 210, virtual machine 230 may be associated with and managed by a cloud computing services provider of the cloud services provider system 102. The virtual machine 202 may include, without limitation, a serverless manager 232. In one embodiment, the serverless manager 232 may be configured to provision one or more serverless applications 234 to one or more virtual machines 210. In one embodiment, the serverless manager 232 may be provisioned on an on-demand basis or before receiving any notification to be processed by a serverless application. For example, the serverless manager 232 may be configured to provision a serverless application 234-1 upon immediate receipt of a notification to be processed by a serverless application 234-1.

For example, and to provision the one or more serverless applications, the serverless manager 232 may identify and/or configure a serverless application container stored in the serverless application datastores 126-4 and configured to process the received notification. Continuing with the example, the serverless manager 232 may further transmit or cause the transmission of the identified and/or configured serverless application containers for execution by a virtual machine 210. Each provisioned serverless application may be identified by a serverless application identifier, which may be a unique alphanumeric identifier among all other serverless applications and may be assigned by the cloud computing services provider of cloud services provider system 102.

In one embodiment, and after the serverless application has been provisioned, the serverless manager 232 may pre-process and/or forward the notification to be further processed to an appropriate serverless application 234. Additionally, one or more subsequent requests and responses received and transmitted by a serverless application may also be forwarded and/or processed by the VM manager 284 before it is transmitted to another system and/or application or received by the appropriate serverless application 234. Example software stacks for serverless computing may include Amazon® AWS Lambda, Serverless® Application Framework, Oracle® Cloud® Fn™, Google® Anthos® Cloud Functions, Microsoft® Azure® Functions, IBM® Bluemix®, or other instances of FaaS or SaaS.

In one embodiment, and to manage increase in demands to process, in real-time, one or more notifications, the serverless manager 232 may be further configured to provision additional serverless applications configured to process these notifications. In one embodiment and to ensure there are adequate computing resources allocated during provisioning of one or more serverless applications, the cluster manager 204 may be further configured to transmit one or more virtual machine (VM) provisioning request the scalable computing system 104 to provision one or more virtual machines 210 based on the one or more notifications and available virtual machines to execute the serverless applications. In one embodiment, the serverless manager 232 may include a combination of hardware (e.g., physical processors, memory, application specific integrated circuit (ASIC), field programmable gate array (FPGA)) and/or executable software (e.g., executable code, interpreted code, managed code, library code, etc.)

It can be appreciated that unlike computing resources (e.g., computing clusters, virtual machines, etc.) of the cluster computing system 106 and depending on implementation, a serverless application may be automatically terminated by the serverless manager 232, as soon as any operations associated with a notification has been appropriately processed by the serverless application.

Figure 2D:
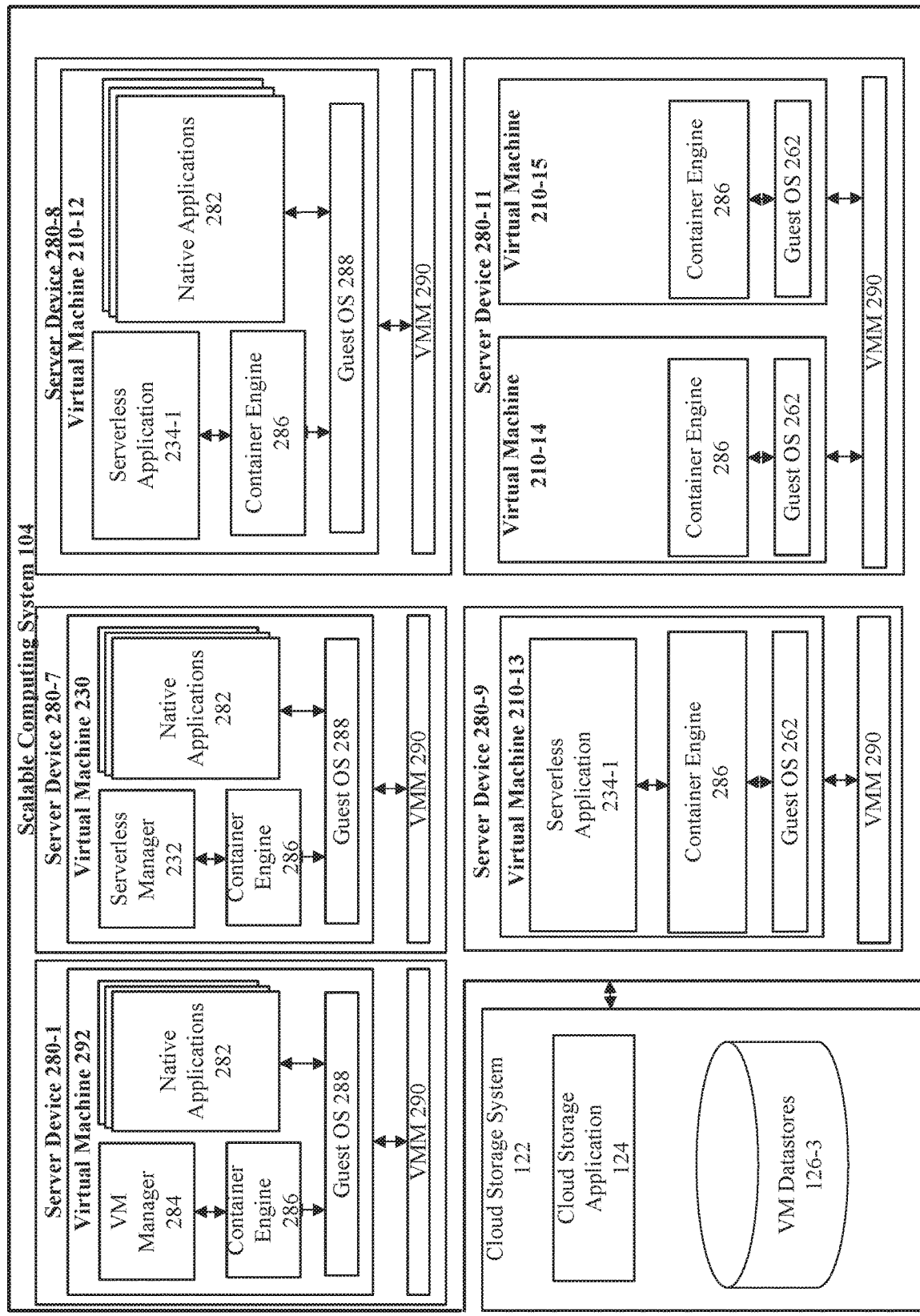
FIG. 2D illustrates server devices and virtual machines of a serverless computing system according to an example embodiment.

FIG. 2D illustrates server devices 280 of the scalable computing system 104 configured to host one or more virtual machines 292, 202, and 210 according to an example embodiment. It is to be appreciated that because the scalable computing system 104 has been discussed with respect to FIG. 2B, the following discussion will be focused primarily on any differences not discussed in FIG. 2B.

As previously illustrated and discussed in FIG. 2B, the scalable computing system 104 may be include a plurality of server devices 210 executing virtual machines 230 and 210. Also as previously illustrated and discussed in FIG. 2B, the virtual machines 210 may be further configured to execute container engines 286. The container engines 286 may be further configured to execute serverless applications as one or more container applications. In one embodiment, the native applications 282 may also be configured to assist in the execution of serverless applications of the one or more guest OS 288.

Figure 3:
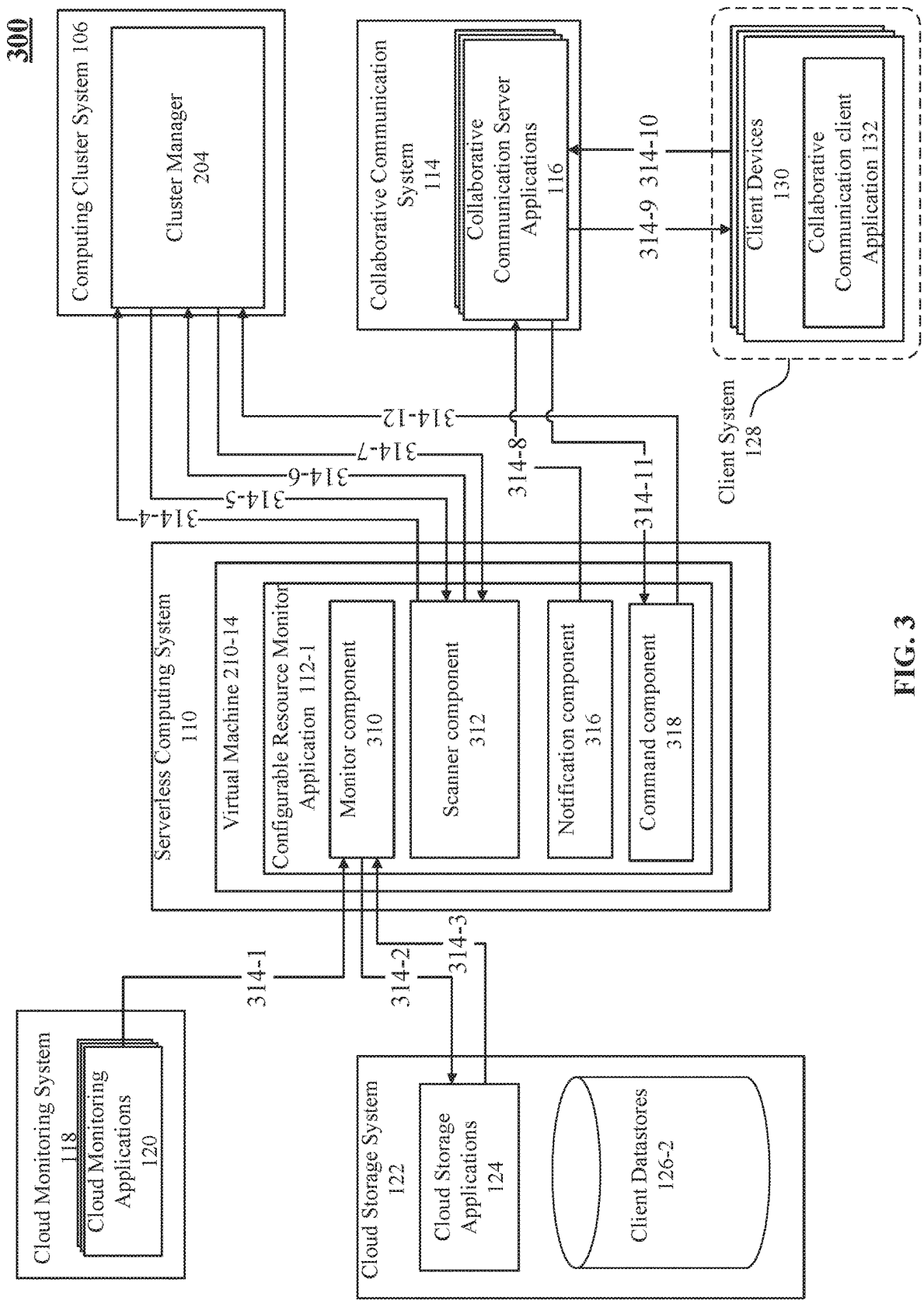
FIG. 3 illustrates example interactions between the components of a configurable resource monitor application, cloud monitoring applications, cloud storage application, data analytics application, and collaborative communication server application according to an example embodiment.

FIG. 3 illustrate one or more operations between the cloud monitoring system 118 the computing cluster system 106, the serverless computing system 110, the cluster computing system 106, the collaborative communication system 114, and client system 128 to monitor long-standing computing resources according to an example embodiment.

In one embodiment, configurable resource monitor application 112-1 may be configured as a serverless application executing on virtual machine 210-14. The configurable resource monitor application 112-1 may further include a monitoring component 310 generally configured to receive a cloud monitoring notification and determine resource identifier scan parameters, a scanner component 312 generally configured to scan the cluster computing system 106 based at least on the resource identifier scan parameter, a notification component 316 generally configured to notify the collaborative communication system 114 based on the results of the scan, and a command component 318 generally configured to receive any commands execution requests from a collaborative communication client application 132 and transmit cloud computing command request to the cluster computing system 106 based on the commands execution requests. The operations of each of the components 310, 312, 316, and 318 will be further discussed with respect to their operations between and among various systems and applications according to some embodiments.

In one embodiment, at stage 314-1 cloud monitoring application 120 may generate and transmit a cloud monitoring notification to the configurable resource monitor application 112-1 based on an occurrence of a cloud monitoring condition (e.g., an elapsed period of time condition, a resource utilization condition, etc.). For example, a cloud monitoring condition may be an elapsed period of time condition, which may occur or trigger every hour, every three hours, and/or the like for one or more days. It can be appreciated that the elapsed period of time condition may be shorter than an hour in some cases. In another example, a cloud monitoring condition may be a resource utilization condition, which may occur or trigger when the current resource utilization of a monitored computing cluster falls below or is predicted to fall below a resource utilization threshold. The monitor component 310 may receive the cloud monitoring notification from the cloud monitoring application 120 indicating an occurrence of a monitored condition (e.g., an elapsed period of time condition, a resource utilization condition, etc.).

In one embodiment, at stage 314-2 the monitoring component 310 may generate a cloud retrieval request and transmit the cloud retrieval request to the cloud storage applications 124 to retrieve a resource monitor configuration container. The cloud retrieval request may identify a resource monitor configuration container for retrieval. The resource monitor configuration container may include, without limitation, a set of access keys (e.g., cryptographic keys, etc.) identifying a user of client system 128 and allowing access to the cluster computing system 106 via one or more communication protocols (e.g., a Webhook, callback URL, etc.) for communicating resource notification messages and command execution requests, a user name that will be used to post the resource notification message, a user image identifier associated with the user name, a notification channel that identifies a collaborative communication channel where a group of users may be subscribed to and where the resource notification message may be posted, a user name tag list that identifies one or more additional users that may be mentioned or tagged in a resource notification message, and/or a set of scan parameters.

In one embodiment, the set of scan parameters may include, without limitation, a resource identifier scan parameter and elapsed time threshold parameter. The resource identifier scan parameter may be used to identify one or more computing resources that have client assigned computing resource identifier matching the resource identifier scan parameter. The elapsed time threshold parameter may identify a threshold number of days, hours, and minutes that a computing resource has been in a particular operational state (e.g., active state, etc.)

In addition to or alternative to the user name and the notification channel, the resource monitor configuration container may further include, without limitation, dynamic notification information. In one embodiment, the dynamic notification information may include, without limitation, one or more dynamic notification entries. The one or more notification entries may also be arranged or ordered as a ranked list of dynamic notification entries, where the arrangement and ordering may be based at least on an organizational structure of users associated with an organization using the collaborative communication server applications 116.

In one embodiment, each dynamic notification entry may include, without limitation, a dynamic notification user name that will receive and/or post a resource notification message, a dynamic notification user image identifier associated with the dynamic notification user name, a dynamic notification channel that identifies a collaborative communication channel where a group or team of users may be subscribed to and where the resource notification message may be posted, a dynamic notification escalation threshold that indicates a period of time that is elapsed before another dynamic notification entry is selected and used to notify a different user and/or different collaborative communication channel, and/or a dynamic notification user name tag list that identifies one or more additional users that may be mentioned or tagged in a resource notification message.

For example, the dynamic notification information may include a ranked list of dynamic notification entries. The ranked list of dynamic notification entries may be arranged or ordered based at least on organizational ranks within an organizational structure of the users identified by their dynamic notification user names. The ranked list of dynamic notification entries may begin with a first dynamic notification entry identifies a first user (e.g., an associate software engineer, etc.). The first user may be a user with the lowest organizational rank within the organizational structure (e.g., associate software engineer, senior software engineer, etc.) of an organization. The ranked list of dynamic notification entries may also include a second dynamic notification entry that identifies a second user (e.g., a senior software engineer, etc.). The second user may be a user with an organizational rank that is higher than the first user (e.g., senior software engineer is higher in organizational rank than an associate software engineer, etc.) for the same organization. The ranked list of dynamic notification entries may further include additional and higher organizationally ranked users and so forth. It can be appreciated that the example is not limited to this context. In one embodiment, at stage 314-3 and in response to the cloud retrieval request, the monitor component 310 may receive the one or more resource monitor configuration containers. Based on the received resource monitor configuration container, the monitoring component 310 may then determine at least a communication protocol, and one or more resource attribute scan parameters.

In one embodiment, at this stage the scanner component 312 may begin to scan a cluster computing system 106 for one or more computing resources (e.g., computing cluster comprising master node 206 and slave nodes 208-1, 208-2, 208-3, 208-4, and 208-5, etc.) having: (1) a client assigned computing resource identifier that matches the resource identifier scan parameter and; (2) one or more computing resource attributes that match the one or more resource attribute scan parameters. To scan a cluster computing system 106, the monitor component 310 may further perform stages 314-4, 314-5, 314-6 and 314-7 as further discussed below.

In one embodiment, at stage 314-4 the scanner component 312 may first create a communication session with the cluster manager 204 of the cluster computing system 106 based on a client's access keys so that the established communication session may be associated with a client of the cluster computing system 106. After establishing a communication session, the scanner component 312 may generate and transmit a resource search request, which may include one or more resource attribute scan parameters. The one or more resource attribute scan parameters may include, without limitation, a resource status scan parameter and a creation time before scan parameter. The resource status scan parameter may identify one or more computing resources (e.g., computing clusters, etc.) that are currently in a specific operational state (e.g., starting state, boot strapping state, running state, waiting state, terminating state, terminated state, terminated with error state, etc.).

In one embodiment, the creation time before scan parameter may be set to identify all computing resources that have been created before a specific date and time. To determine the creation time before scan parameter, the scanner component 312 may first determine the current date and time and then subtract the current date and time by the elapsed time threshold parameter. For example, assuming that the current date and time as determined by the scanner component 312 is Jan. 1, 2019 at 7 PM EST and the elapsed time threshold parameter is set for 5 hours, then creation time before scan parameter may be set for Jan. 1, 2019 at 2 PM EST so as to identify all computing resources associated with the client that have been created before Jan. 1, 2019 at 2 PM EST.

In one embodiment, at stage 314-5 the cluster manager 204 may determine and transmit a resource search response to the configurable resource monitor application 112-1. The resource search response may include, without limitation, a list of cloud computing resource identifiers having computing resource attributes that match the resource attribute scan parameters. In response, the scanner component 312 may then receive the resource search response including the list of cloud computing resource identifiers determined by the cluster manager 204 as having computing resource attributes that match the resource attribute scan parameters.

In one embodiment, and to determine the list of cloud computing resource identifiers, the cluster manager 204 may compare one or more computing resource attributes, which may be associated with one, or more computing clusters, with the resource attribute scan parameters. In one embodiment, and continuing with the above example and assuming that a computing cluster, which includes master node 206, and slave nodes 208-1, 208-2, 208-3, 208-4, and 208-5, has an associated resource status attribute set to active state, time of creation attribute set to Jan. 1, 2019, 1 PM EST. Then the cluster manager 204 may identify the computing cluster as having computing resource attributes that match the resource attribute scan parameters. This is because the computing cluster has an active state and has a time of creation of Jan. 1, 2019, 1 PM EST, which is before the creation time before scan parameter set to Jan. 1, 2019 at 2 PM EST. The cluster manager 204 may further generate the list of cloud computing resource identifiers that would include the cloud computing cluster identifier for the computing cluster.

In one embodiment, at stage 314-6, the scanner component 312 may generate and transmit one or more resource description requests for each of the computing resources identified in the list of cloud computing resource identifiers previously received from the cluster manager 204. Each resource description request may include, without limitation, a cloud computing resource identifier (e.g., "j-2LOR-EMIPSUM1234") that identifies the computing resource (e.g., computing cluster that includes master node 206, and slave nodes 208-1, 208-2, 208-3, 208-4, and 208-5). The cluster manager 204 may receive the one or more resource description requests. In response to each resource description request, cluster manager 204 may generate a corresponding one or more resource description responses. Each resource description response may include, without limitation, a set of computing resource attributes-value pairs. In addition, each set of computing resource attributes-value pairs may correspond to a computing resource identified in the list of cloud computing resource identifiers.

In one embodiment, the set of computing resource attributes-value pairs may include, without limitation, a cloud computing resource identifier attribute-value pair that includes the cloud computing resource identifier for a corresponding computing resource (e.g., cloud computing cluster identifier for a computing cluster, etc.), a computing resource name attribute-value pair that includes a computing resource name for the corresponding computing resource (e.g., a cluster name for a computing cluster, etc.), a creation date and time attribute value-pair that specifies a date and time of creation for the corresponding computing resource (e.g., date and time a computing cluster was created, etc.), an instance count value-pair that includes a number of other computing resources (e.g., virtual machines, master and slave nodes, etc.) used by the corresponding computing resource (e.g., a number of virtual machines used by a computing cluster, a number of master and slave nodes used by a computing cluster etc.), a geographic region attribute-value pair that includes a geographic region of where a computing resource is physically located (e.g., Northern Virginia, Ohio, Northern California, Montreal, Ireland, Frankfurt, Singapore, etc.), an operational status attribute-value pair that identifies the state of the computing resource (e.g., starting state, boot strapping state, running state, waiting state, terminating state, terminated state, terminated with error state, etc.) and/or any other attribute-value pair that may be associated with a computing resource.

In one embodiment, the set of computing resource attributes-value pairs may further include client assigned identifiers, which may without limitation, a client assigned computing resource identifier attribute-value pair that identifies the client assigned computing resource identifier for the computing resource and client assigned environment identifier attribute-value pair that identifies a type of development environment for the computing resource (e.g., production environment, testing or quality assurance environment, etc.).

In one embodiment, at stage 314-7 the scanner component 312 may receive the one or more resource description responses where each resource description response may include, without limitation, a set of computing resource attributes-value pairs. The scanner component 312 may generate a computing resource description list that may include, without limitation, one or more sets of computing resource attributes-value pairs received from the cluster manager 204. The scanner component 312 may then filter out zero or more sets of computing resource attributes-value pairs from the computing resource description list that do not contain the resource identifier scan parameter.

In one embodiment, to filter the computing resource description list, the scanner component 312 may identify one or more sets of cloud computing resource identifier attribute-value pairs in the computing resource description list having client assigned computing resource identifier that do not match the resource identifier scan parameter. For example, the scanner component 312 may compare a value of the client assigned computing resource identifier attribute-value pair with the resource identifier scan parameter for each set of computing resource attributes-value pairs in the computing resource description list. Continuing with the example, the scanner component 312 may then remove or otherwise discard one or more sets of computing resource attributes-value pairs from the computing resource description list that does not have a client assigned computing resource identifier matching the resource identifier scan parameter to generate a filtered computing resource description list.

In one embodiment, at stage 314-8, the notification component 316 may generate and transmit a resource notification request based at least on the filtered computing resource description list. The generated resource notification request may include, without limitation, a user name, a user image identifier, a notification channel and/or user name tag list. In one embodiment, the notification component 316 may determine the user name, the user image identifier, and/or the notification channel of the resource notification request by using the user name, the user image identifier, and the notification channel of the resource monitor configuration container received at stage 314-3.

Additionally or alternatively, in implementations where the resource monitor configuration container received at stage 314-3 includes dynamic notification information, the notification component 316 may dynamically select an appropriate user and/or associated collaborative communication channel to be notified and consequently, allow the appropriate user and/or associated collaborative communication channel to quickly take appropriate action based on the notification. To dynamically select an appropriate user and/or associated collaborative communication channel to be notified, the notification component 316 may determine an initial notification entry that identifies an appropriate user and/or associated collaborative communication channel to notify regarding any long-standing or idle computing resources.

In one embodiment, the notification component 316 may determine the initial notification entry based at least on one or more dynamic notification matching criteria. In one embodiment, the dynamic notification matching criteria may be configured to increase the likelihood a user and/or associated dynamic communication channel that is notified of any long-standing or idle computing resources will also be able to quickly take appropriate action, such as, for example, quickly take action to terminate any long-standing or idling computing resources.

For example, the one or more dynamic notification matching criteria may include, without limitation, a rank matching criteria, which may be configured to require a user to have a specific organizational rank (e.g., highest rank, lowest rank, etc.) among the users identified in the ranked list of dynamic notification entries. In another example, the one or more dynamic notification matching criteria may include, without limitation, a status matching criteria configured to require a user to have a specific status (e.g., active status) among the users identified in the ranked list of dynamic notification entries.

To determine the initial notification entry, the notification component 316 may send a user status request to the collaborative communication server applications 116 using the communication protocol determined at stage 314-3 and/or a separate communication protocol for providing user status information. The user status request may be configured to request user statuses for each user included in a ranked list of dynamic notification entries of the dynamic notification information. In one embodiment, the user status request may include, without limitation, a ranked list of dynamic notification user names included in the ranked list of dynamic notification entries.

In response, the notification component 316 may then receive a user status response from the collaborative communication server applications 116. The received user status response may include, without limitation, a ranked list of user statuses, where each user status in the ranked list of user statuses may correspond in rank to a dynamic notification user name of the ranked list of dynamic notification user names. After receiving the ranked list of user statuses, the notification component 316 may then identify an initial matching user name among the ranked list of dynamic notification user names that satisfies the one or more dynamic notification matching criteria.

For example, the one or more dynamic notification matching criteria may include a rank matching criteria configured to require a user to have the lowest organizational rank in a ranked list. Additionally, the one or more dynamic notification matching criteria may include a status matching criteria configured to require the user to have an active status in a ranked list, which may indicate that the user is ready and able to take appropriate actions upon receiving a resource notification message. Continuing with this example, the notification component 316 may then identify an initial matching user in the ranked list of dynamic notification user names, which corresponds in rank to the ranked list of user statuses, that satisfies both the status matching criteria and the rank matching criteria. The identified initial matching user may be identified by its initial matching user name.

After identifying the initial matching user name, the notification component 316 may further determine an initial notification entry with a dynamic notification user name that matches the initial matching user name. After determining the initial notification entry, the notification component 316 may then generate the user name, the user image identifier, and/or the notification channel of the resource notification request by using the dynamic notification user name, the dynamic notification user image identifier, and the dynamic notification channel of the initial notification entry.

Regardless of how the user name, the user image identifier, and/or the notification channel of the resource notification request is generated, the notification component 316 may further generate the resource notification request to include one or more resource notification messages corresponding to one or more sets of computing resource attributes-value pairs in the filter computing resource description list. Each resource notification message may include, without limitation, a cloud computing resource identifier, a computing resource name, a creation date and time, a geographic region identifier, an operational status, an environment identifier and/or any other information that may be relevant to determine the identity and status of the computing resource. Furthermore, each resource notification message may also include an elapsed time since creation, which may be determined, by the notification component 316, by calculating a date and time difference between current date and time and the creation date and time for a particular computing resource as indicated in the one or more sets of computing resource attributes-value pairs in the filter computing resource description list.

Additionally, the notification component 316 may further generate each resource notification message to include, without limitation, one or more mentions or tags of one or more additional users by using the user name tag list of the resource monitor configuration container received at stage 314-3. Additionally or alternatively, in implementations where the resource monitor configuration container received at stage 314-3 includes dynamic notification information, the notification component 316 may also generate each resource notification message to include, without limitation, one or more mentions or tags of one or more additional users by using the dynamic notification user name tag list of the initial notification entry. It can be appreciated that by including the one or more mentions or tags in the resource notification message, additional users may be notified by the collaborative communication server applications 116.

In one embodiment and after generating the resource notification request, the notification component 316 may transmit the resource notification request to the collaborative communication server applications 116 via the communication protocol determined at stage 314-3. For example, by transmitting a HTTP POST request for a specific URL identified by the communication protocol, where the HTTP POST request includes the resource notification request. At this time, the command component 318 may wait or idle until a command execution request is received within a specific execution period (e.g., 30 minutes, 1 hour, 2 hours etc.).

In one embodiment, at stage 314-9 and in response to stage 314-8, the collaborative communication server applications 116 may receive the resource notification request. After receiving the request, the collaborative communication server applications 116 may transmit the resource notification message using synchronous and/or asynchronous conferencing to the collaborative communication client applications 132. To transmit the resource notification message, the collaborative communication server applications 116 may use the user name, the user image identifier, and notification channel received in the resource notification request.

For example, the collaborative communication server applications 116 may transmit the resource notification message to a user via their associated client device, where the user is identified by the user name in the resource notification request. Additionally or alternatively, the collaborative communication server applications 116 may post the resource notification message to a collaborative communication channel identified by the notification channel of the resource notification request where all users within the collaborative communication channel will receive the resource notification message via their associated client devices. To identify the user posting the resource notification message, the collaborative communication server applications 116 may also post the resource notification message in the collaborative communication channel using the user name and the user image identifier of the resource notification request. An example embodiment of the resource notification message is further discussed and illustrated with respect to FIG. 4.

In one embodiment, at stage 314-10 a collaborative communication client application may receive a command execution message from a user who received the previously transmitted resource notification message. The command execution message may include a command (e.g., "terminate"), one or more cloud computing resource identifiers (e.g., "j-2LOREMIPSUM1234", "j-3LOREMIPSUM1234," etc.), and/or one or more command parameters associated with the command. The collaborative communication client application may then transmit the command execution message to the collaborative communication server applications 116.

In one embodiment, at stage 314-10 the collaborative communication server applications 116 may receive the command execution message and generate a command execution request based on the command execution message. The command execution request may be specifically formatted for the communication protocol identified at stage 314-3 or a separate communication protocol may be used (e.g., a HTTP callback or webhook identified by a callback URL associated with one or more configurable resource monitor application 112-1, etc.). The command execution request may include, without limitation, the command, one or more cloud computing resource identifiers, and/or one or more command parameters.

In one embodiment at stage 314-11, the command component 318 may receive the command execution request from the collaborative communication server applications 116. The command component 318 may generate a cloud computing command request based on the received command execution request. The cloud computing command request may be specifically formatted for communication with the cluster manager 204 via the communication session previously established at stage 314-4. The cloud computing command request may include, without limitation, the command, the one or more cloud computing resource identifiers, and/or the one or more command parameters.

In one embodiment at stage 314-12, the command component 318 may then transmit the cloud computing command request to the cluster manager 204 and the serverless computing system 110 may terminate the configurable resource monitor application 112-1 and free up any computing resources used by the configurable resource monitor application 112-1. Additionally, the cluster manager 204 may receive the cloud computing command request and execute the cloud computing command request based on the command the command, the cloud computing resource identifier, and/or one or more command parameters.

In one example, the command is "terminate," and the cloud computing resource identifier is "j-2LOREMIPSUM1234," which is associated with computing cluster that includes master node 206 and slave nodes 208-1, 208-2, 208-3, 208-4, and 208-5. In this example, the cluster manager 204 may then terminate the computing cluster with master node 206 and slave nodes 208-1, 208-2, 208-3, 208-4, and 208-5 executing on virtual machines 210-1, 210-2, 210-3, 201-4, and 210-5. It is to be appreciated that the termination of the computing cluster may also free up any computing resources such as virtual machines 210-1, 210-2, 210-3, 201-4, and 210-5 and physical resources (e.g., physical processors, RAM, etc.) associated with server devices 280-3, 280-4, 280-5, and 280-6.

In one embodiment and if the generated command execution request is not received by the command component 318 at stage 314-11 within the specific execution period (e.g., 30 minutes, 1 hour, 2 hours etc.), then the serverless computing system 110 may terminate the configurable resource monitor application 112-1 so that any computing resources (e.g., virtual processors, and RAM of the virtual machine 210-12) used by the configurable resource monitor application 112-1 may be freed.

Additionally or alternatively, in implementations where the resource monitor configuration container includes dynamic notification information, the command component 318 may wait or idle for a specific time period (e.g., 30 minutes, 1 hour, 2 hours, etc.) as indicated by a dynamic notification escalation threshold of the initial notification entry at stage 314-8. This allows the command component 318 to determine whether the initial matching user identified in an initial notification entry at stage 314-8 has appropriately responded within a time period specified by the dynamic notification escalation threshold of the initial notification entry.

If the command component 318 does not receive any command execution request within the dynamic notification escalation threshold of the initial notification entry, then the command component 318 may request the notification component 316 to generate and transmit a second resource notification request. Moreover, the notification component 316 may transmit the generated second resource notification request to a second matching user and/or associated collaborative communication channel (different than the initial matching user and/or its associated collaborative communication channel) who can also be notified regarding any long-standing or idle computing resources. To identify a second matching user and/or associated collaborative communication channel, the notification component 316 may perform substantially similar operations as those discussed with respect to stage 314-8 for the initial matching user.

For example in response to the request from the command component 318, the notification component 316 may first refresh the previously received ranked list of user statuses by sending a second user status request to the collaborative communication server applications 116 using the communication protocol determined at stage 314-3 and/or a separate communication protocol for providing user status information. The second user status request may include, without limitation, the previously ranked list of dynamic notification user names included in the ranked list of dynamic notification entries.

Continuing with the previous example and in response to receiving the second user status request, the notification component 316 may then receive a second user status response from the collaborative communication server applications 116. The received second user status response may include, without limitation, a refreshed ranked list of user statuses, where each user status in the refreshed ranked list of user statuses may correspond in rank to a dynamic notification user name of the ranked list of dynamic notification user names.

Continuing with the previous example and after receiving the refreshed ranked list of user statuses, the notification component 316 may then identify a second matching user name among the ranked list of dynamic notification user names that satisfies both the previously configured status matching criteria and rank matching criteria using substantially similar operations as discussed at stage 314-8. However, to provide a new and different second matching user name than the previously identified initial matching user name, the notification component 316 may explicitly exclude the previously identified initial matching user name during the identification operations discussed at stage 314-8.

Continuing with the previous example and after identifying the second matching user name, the notification component 316 may further determine a second notification entry with a dynamic notification user name that matches the second matching user name. After determining the second notification entry, the notification component 316 may then generate second resource notification request using previously generated resource notification message and the dynamic notification user image identifier, and the dynamic notification channel of the second notification entry.

Alternatively and instead of reusing the previously generated resource notification message where some of the information may be stale or out of date, the notification component 316 may refresh the previously generated resource notification message. Specifically, the notification component 316 may request the scanner component 312 to perform stages 314-4-314-7 to generate a refreshed filtered computing resource description list. The notification component 316 may then generate the resource notification request to include one or more refreshed resource notification messages that may correspond to one or more sets of refreshed computing resource attributes-value pairs in the refreshed filter computing resource description list. The refreshed resource notification messages may also include one or more mentions or tags of one or more additional users by using the dynamic notification user name tag list of the second notification entry.

Continuing with the previous example and after generating the second resource notification request, the notification component 316 may transmit the resource notification request to the collaborative communication server applications 116 via the communication protocol determined at stage 314-3. The command component 318 may then wait or idle until a command execution request is received by the second matching user within another specific period (e.g., 30 minutes, 1 hour, 2 hours etc.) as indicated by a dynamic notification escalation threshold of the second notification entry at stage 314-8.

It can be appreciated that the command component 318 may request the notification component 316 to generate and transmit additional resource notification requests (e.g., third resource notification request, fourth resource notification request, etc.) to additional matching users, if the command component 318 does not receive any command execution requests within the dynamic notification escalation threshold of the second notification entry. Moreover, the command component 318 may generate and transmit additional resource notification requests using similar operations as discussed above and until all users and/or collaborative communication channels identified in the ranked list of dynamic notification entries have been exhausted.

It can also be appreciated that while a set of operations has been discussed with respect to an execution of a configurable resource monitor application 112-1, a similar set of operations may be performed by another instance of execution, e.g., by a configurable resource monitor application 112-2. For example, configurable resource monitor application 112-1 may be configured to scan a cluster computing system 106 based on an elapsed period of time condition set for every three hours while configurable resource monitor application 112-2 maybe configured to scan a cluster computing system 106 set for every one hour.

It can be further appreciated that different instances of execution of the scanner component 312 may filter the computing resource description list to include only sets of cloud computing resource identifier attribute-value pairs that have client assigned environment identifier attribute-value pair set for different environments (e.g., production environment, testing or quality assurance environment, etc.). For example, the scanner component 312 of the configurable resource monitor application 112-1 may filter the computing resource description list to include only sets of cloud computing resource identifier attribute-value pairs that have client assigned environment identifier attribute-value pair set for production environment.

In contrast, the scanner component 312 of the configurable resource monitor application 112-2 may filter the computing resource description list to include only sets of cloud computing resource identifier attribute-value pairs that have client assigned environment identifier attribute-value pair set for testing or quality assurance environment. Thus, the configurable resource monitor application 112-1 may send resources notification messages for computing resources in a production environment while the configurable resource monitor application 112-2 may send resources notification messages for computing resources in a testing or a quality assurance environment.

Figure 4:
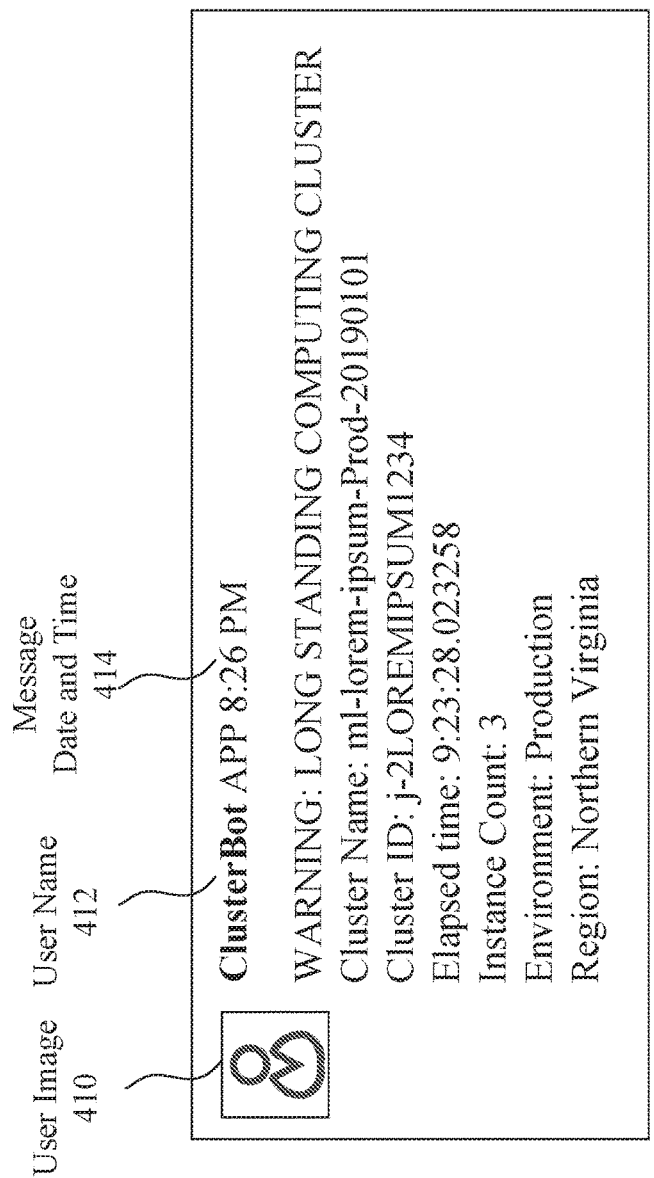
FIG. 4 illustrates an example resource notification message according to an example embodiment.

FIG. 4 illustrates an example resource notification message 400 according to an example embodiment.

In one embodiment, the resource notification message 400 may include, without limitation, a user name 412 identifying a user (e.g., "ClusterBot") that sent the resource notification message, a user image 410 which may be identified by the user image identifier and associated with the user name 412, and/or a message date and time 414 that identifies the date and time the message was sent (e.g., "8:26 PM").

In the example embodiment, the resource notification message 400 may further include, without limitation, a computing resource name (e.g., "ml-lorem-ipsum-Prod-20190101"), a cloud computing resource identifier (e.g., "j-2LOREMIPSUM1234"), an elapsed time since creation (e.g., "9:23:28.023258"), an instance count ("3"), a client assigned environment identifier (e.g., "Production"), and a geographic region identifier ("Northern Virginia").

Provided herein are some of the processing operations illustrated as one or more logic flows that may be performed by one or more example embodiments. Although some of the processing operations may appear to be performed sequentially, it can be appreciated that the processing operations may not be limited to the order as illustrated and/or described. Additionally, some of the processing operations may even occur substantially simultaneously or contemporaneously with respect to other processing operations.

FIG. 5 illustrates logic flow 500 that may be performed by a configurable resource monitor application 112-1 for monitoring long-standing computing resources according to an example embodiment.

At stage 510, the configurable resource monitor application 112-1 may receive a cloud monitoring notification from a cloud monitoring application 120, wherein the cloud monitoring notification indicates an occurrence of a monitored condition.

At stage 512, the configurable resource monitor application 112-1 may scan a cluster computing system 106 for at least one computing resource having a client assigned resource identifier and at least one computing resource attribute based on a resource identifier scan parameter and at least one resource attribute scan parameter.

At stage 514, the configurable resource monitor application 112-1 may generate a resource notification request based on the scan of the cluster computing system 106.

At stage 516, the configurable resource monitor application 112-1 may transmit the resource notification request to a collaborative communication system 114 to notify a user that the computing resource has a computing resource attribute that matches the resource attribute scan parameter.

At stage 518, the configurable resource monitor application 112-1 may request to execute a cloud computing command by the cluster computing system 106 based on a command execution request received from the collaborative communication system 114.

FIG. 6 illustrates logic flow 600 that may be performed by a monitor component 310 of a configurable resource monitor application for monitoring long-standing computing resources according to an example embodiment.

At stage 610, the monitoring component 310 may receive a cloud monitoring notification, wherein the cloud monitoring notification may indicates an occurrence of a monitored condition.

At stage 612, the monitoring component 310 may determine at least a resource identifier scan parameter and a resource attribute scan parameter based on a resource monitor configuration container stored in a client datastores 126-2.

Figure 7:
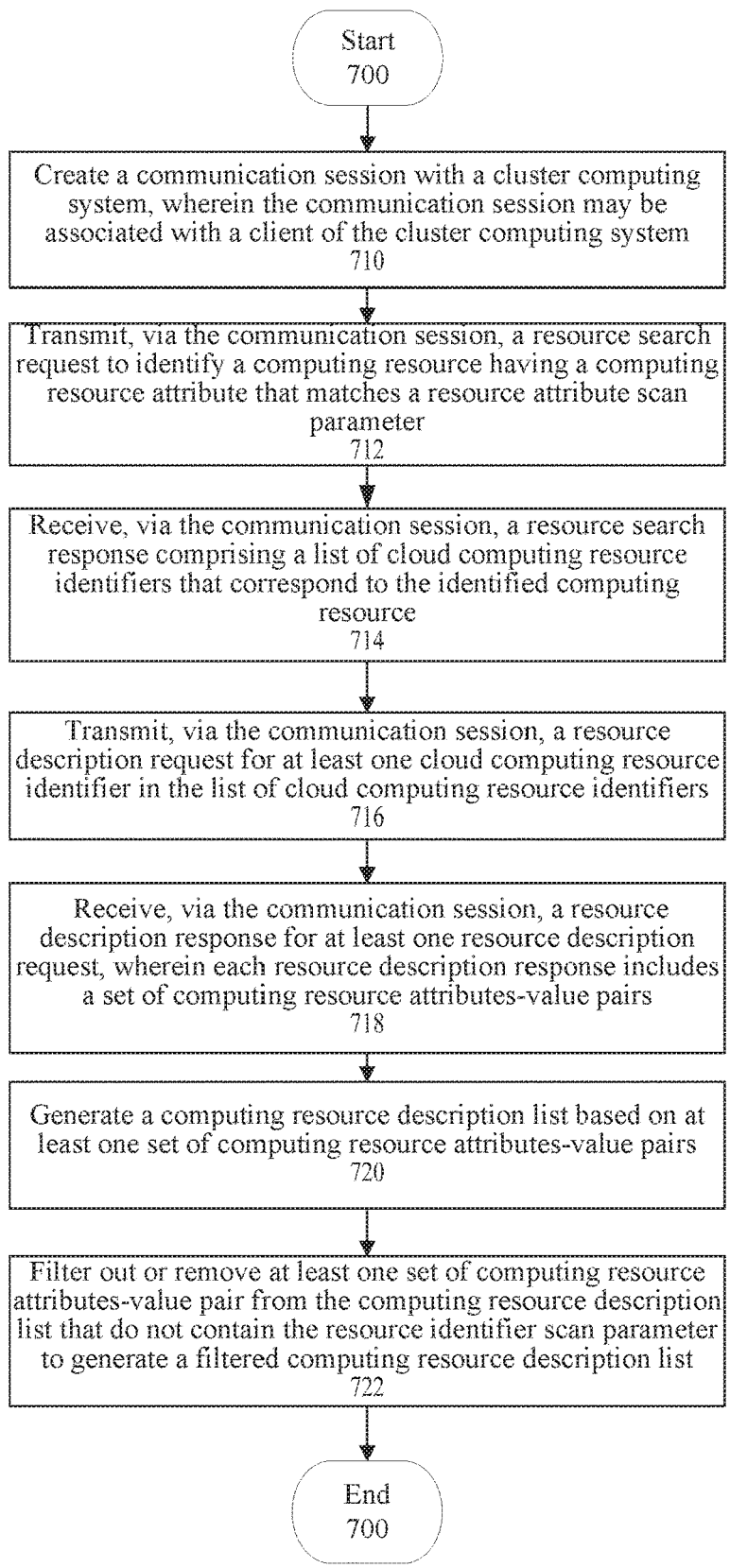
FIG. 7 illustrates a logic flow that may be performed by a scanner component of a configurable resource monitor application for monitoring long-standing computing resources according to an example embodiment.

FIG. 7 illustrates logic flow 700 that may be performed by a scanner component 312 of a configurable resource monitor application for monitoring long-standing computing resources according to an example embodiment.

At stage 710, the scanner component 312 may create a communication session with a cluster computing system 106, wherein the communication session may be associated with a client of the cluster computing system 106.

At stage 712, the scanner component 310 may transmit, via the communication session, a resource search request to identify a computing resource having a computing resource attribute that matches a resource attribute scan parameter.

At stage 714, the scanner component 312 may receive, via the communication session, a resource search response comprising a list of cloud computing resource identifiers that correspond to the identified computing resource.

At stage 716, the scanner component 312 may transmit, via the communication session, a resource description request for at least one cloud computing resource identifier in the list of cloud computing resource identifiers.

At stage 718, the scanner component 312 may receive, via the communication session, a resource description response for at least one resource description request, wherein each resource description response includes a set of computing resource attributes-value pairs.

At stage 720, the scanner component 312 may generate a computing resource description list based on at least one set of computing resource attributes-value pairs.

At stage 722, the scanner component 312 may filter out or remove at least one set of computing resource attributes-value pair from the computing resource description list that do not contain the resource identifier scan parameter to generate a filtered computing resource description list.

Figure 8:
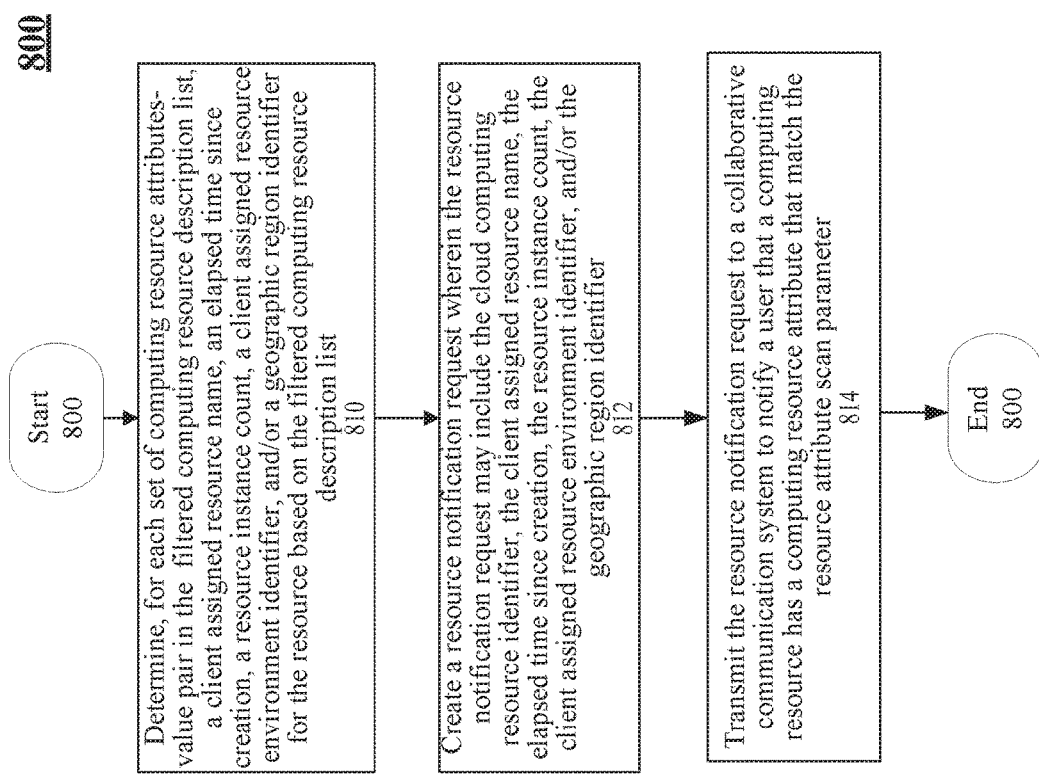
FIG. 8 illustrates a logic flow that may be performed by a notification component of a configurable resource monitor application for monitoring long-standing computing resources according to an example embodiment.

FIG. 8 illustrates a logic flow 800 that may be performed by a notification component 316 of a configurable resource monitor application for monitoring long-standing computing resources according to an example embodiment.

At stage 810, the notification component 316 may determine, for each set of computing resource attributes-value pair in the filtered computing resource description list, a client assigned resource name, an elapsed time since creation, a resource instance count, a client assigned resource environment identifier, and/or a geographic region identifier for the resource based on the filtered computing resource description list.

At stage 812, the notification component 316 may create a resource notification request wherein the resource notification request may include the cloud computing resource identifier, the client assigned resource name, the elapsed time since creation, the resource instance count, the client assigned resource environment identifier, and/or the geographic region identifier.

At stage 814, the notification component 316 may transmit the resource notification request to a collaborative communication system 114 to notify a user that a computing resource has a computing resource attribute that match the resource attribute scan parameter. For example, the notification component 316 may transmit the resource notification request to one or more users and/or associated collaborative communication channels via collaborative communication system 114, where the resource notification request may include, without limitation, a resource notification message. Additionally or alternatively, prior to transmitting the resource notification request the notification component 316 may dynamically select one or more users and/or associated collaborative communication channels to receive a resource notification message that is most likely to take immediate action upon receipt of the resource notification message. The notification component 316 may dynamically select the one or more users based at least on one or more dynamic notification matching criteria (e.g., user is in active status and has a specific organizational rank).

Figure 9:
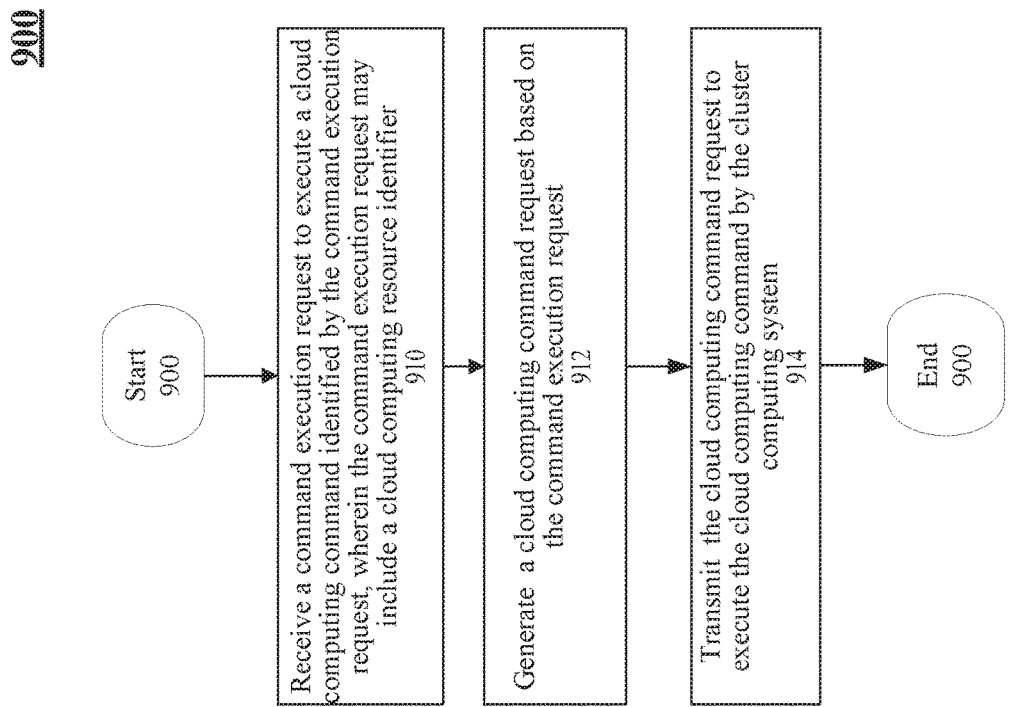
FIG. 9 illustrates a logic flow that may be performed by a command component of a configurable resource monitor application for monitoring long-standing computing resources according to an example embodiment.

FIG. 9 illustrates a logic flow 900 that may be performed by a command component 318 of a configurable resource monitor application for monitoring long-standing computing resources according to an example embodiment.

At stage 910, the command component 318 may receive a command execution request to execute a cloud computing command identified by the command execution request, wherein the command execution request may include a cloud computing resource identifier.

At stage 912, the command component 318 may generate a cloud computing command request based on the command execution request.

At stage 914, the command component 318 may transmit the cloud computing command request to execute the cloud computing command by the cluster computing system 106.

Various embodiments and components therein can be implemented, for example, using one or more well-known computer systems, such as, for example, the example embodiments, systems, and/or devices (e.g., server devices 280, cloud storage system 122, client devices 130, cloud monitoring system 118, etc.) shown in the figures or otherwise discussed. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure or bus 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an example embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communications path 1026.

In an embodiment, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Figure 10:
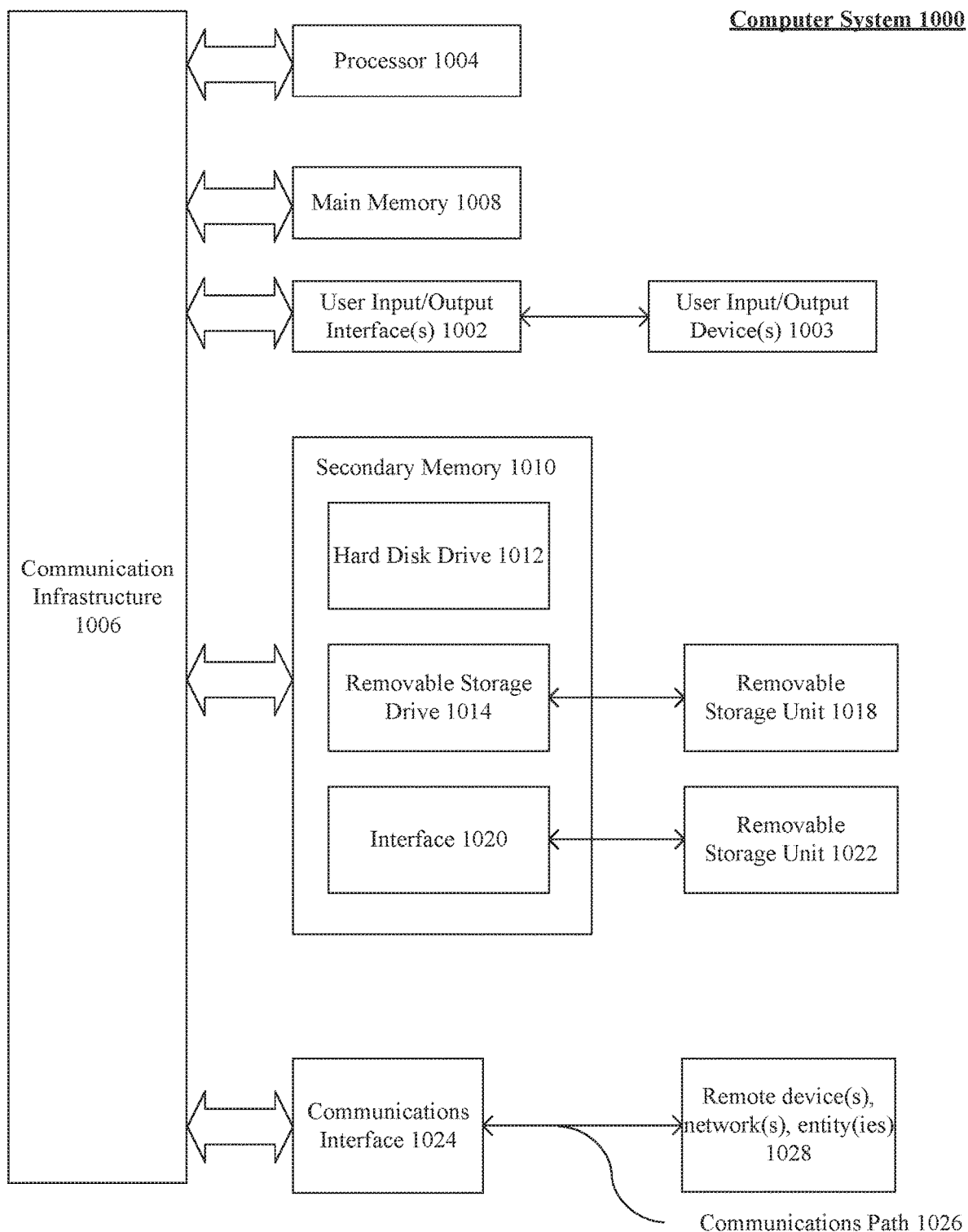
FIG. 10 is an example computer system useful for implementing various embodiments of this disclosure.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all example embodiments as contemplated by the inventor, and thus, are not intended to limit this disclosure or the appended claims in any way.

While this disclosure describes example embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A server device, comprising:
   a memory; and
   at least one processor coupled to the memory, wherein the
      at least one processor is configured to:

receive, by a resource monitor from a cloud monitoring system, a cloud monitoring notification, wherein the cloud monitoring notification indicates an occurrence of a monitored condition;
scan, by the resource monitor, at least one resource of a cluster computing system by at least:
generating a resource description list that includes at least one resource description, wherein the at least one resource description corresponds to the at least one resource having a computing resource attribute that matches at least one resource attribute scan parameter, and
filtering the resource description list based at least on whether the at least one resource description contains a resource identifier scan parameter to generate a filtered resource description list, wherein:
the filtered resource description list includes a resource description for a resource having a resource identifier that matches the resource identifier scan parameter, and
the resource identifier is an identifier assigned by a client of the cluster computing system to identify the at least one resource managed by the client;
generate, by the resource monitor, a resource notification request based at least on the filtered resource description list; and
transmit, by the resource monitor, the resource notification request to a communications system to notify a user that the at least one resource has the computing resource attribute that matches the at least one resource attribute scan parameter.

2. The server device of claim 1, wherein the monitored condition is an elapsed period of time condition and the cloud monitoring system is configured to:
determine whether the elapsed period of time condition has occurred based on a current date and time,
generate the cloud monitoring notification based on a determination that the elapsed period of time condition has occurred, and
transmit the cloud monitoring notification to the resource monitor.

3. The server device of claim 1, wherein:
the computing resource attribute includes a resource status attribute and a time of creation attribute, the resource status attribute identifies an operational state of the at least one resource, and the time of creation attribute identifies date and time of creation of the at least one resource, and
the resource attribute scan parameter includes a resource status scan parameter and a creation time before scan parameter, the resource status scan parameter identifies an operational state of a resource, and the creation time before scan parameter identifies a resource that has been created before a specific date and time.

4. The server device of claim 3, wherein the scan of the at least one resource of the cluster computing system further comprises:
creating, by the resource monitor, a communication session with the cluster computing system, wherein the communication session is associated with the client of the cluster computing system;
transmitting, by the resource monitor via the communication session, a resource search request to identify a resource having the resource status attribute that matches the resource status scan parameter and having time of creation attribute that matches or is earlier in time than creation time before scan parameter; and
receiving, by the resource monitor via the communication session, a resource search response comprising a list of cloud computing resource identifiers that correspond to the resource identified in response to the resource search request.

5. The server device of claim 1, wherein:
the resource includes a first resource and a second resource associated with the client,
the first resource is a first computing cluster configured to perform data analytics in a production environment and is associated with the resource identifier, a first cloud computing resource identifier, or a first resource status attribute, and
the second resource is a second computing cluster configured to perform data analytics in a testing environment and is associated with the resource identifier, a second cloud computing resource identifier, or a second resource status computing resource attribute.

6. The server device of claim 5, wherein:
the first computing cluster is operatively coupled to a distributed datastore and includes a master cluster node and a slave cluster node,
the master cluster node is configured to monitor operational status of the slave cluster node, and
the master cluster node is configured to request the slave cluster node to perform the data analytics in the production environment on client data stored in the distributed datastore, wherein the data analytics includes an execution of a machine learning algorithm.

7. The server device of claim 5, wherein:
the second computing cluster is operatively coupled to a distributed datastore and includes a master cluster node and a slave cluster node,
the master cluster node is configured to monitor operational status of the slave cluster node, and
the master cluster node is configured to request the slave cluster node to perform the data analytics in the testing environment on client data stored in the distributed datastore, wherein the data analytics includes an execution of a map function and a reduce function.

8. A computer-implemented method, comprising:
receiving, by a resource monitor from a cloud monitoring system, a cloud monitoring notification, wherein the cloud monitoring notification indicates an occurrence of a monitored condition;
scanning, by the resource monitor, at least one resource of a cluster computing system to generate a filtered computing resource description list, wherein:
the filtered computing resource description list includes a resource description associated with a resource having a resource identifier that matches a resource identifier scan parameter and a computing resource attribute that matches a resource attribute scan parameter,
the resource identifier is an identifier assigned by a client of the cluster computing system to identify the resource managed by the client, and
the filtered computing resource description list is generated by at least filtering at least one resource description associated with the at least one resource based at least on whether the at least one resource description contains the resource identifier scan parameter;

generating, by the resource monitor, a resource notification request based at least on the filtered computing resource description list; and transmitting, by the resource monitor, the resource notification request to a communications system to notify a user that the resource has the computing resource attribute that matches the resource attribute scan parameter.

9. The computer-implemented method of claim 8, wherein the scanning of the at least one resource of the cluster computing system further comprises:

creating, by the resource monitor, a communication session with the cluster computing system, wherein the communication session is associated with the client of the cluster computing system;

transmitting, by the resource monitor via the communication session, a resource search request to identify the resource having the computing resource attribute that matches the resource attribute scan parameter; and receiving, by the resource monitor via the communication session, a resource search response comprising a list of cloud computing resource identifiers that correspond to the resource identified in response to the resource search request.

10. The computer-implemented method of claim 9, wherein the scanning of the cluster computing system further comprises:

transmitting, by the resource monitor via the communication session, a resource description request for at least one cloud computing resource identifier in the list of cloud computing resource identifiers; and receiving, by the resource monitor via the communication session, a resource description response for the resource description request, wherein:
  the resource description response includes the at least one resource description,
  the at least one resource description includes at least one set of computing resource attributes-value pairs, and
  the filtering of the at least one resource description based at least on whether the at least one resource description contains the resource identifier scan parameter further comprises removing a set of computing resource attributes-value pairs of the at least one computing resource attributes-value pairs that does not contain the resource identifier scan parameter.

11. The computer-implemented method of claim 10, wherein the generating of the resource notification request further comprises:

determining, by the resource monitor, a client assigned resource name, an elapsed time since creation, a resource instance count, a client assigned resource environment identifier, or a geographic region identifier for the resource identified in response to the resource search request based on the filtered computing resource description list; and creating, by the resource monitor, the resource notification request, wherein the resource notification request comprises the cloud computing resource identifier, the client assigned resource name, the elapsed time since creation, the resource instance count, the client assigned resource environment identifier, or the geographic region identifier.

12. The computer-implemented method of claim 11, wherein:

the resource environment identifier assigned by the client of the cluster computing system is a unique alpha numeric identifier, the cloud computing resource identifier is a unique alpha numeric identifier assigned by a provider of the cluster computing system to identify the resource in the cluster computing system, the client assigned resource name is an alpha numeric name assigned by the client of the cluster computing system, the elapsed time since creation is a difference in date and time between a creation date and time of the resource and a current date and time, the resource instance count is a number of resource instances associated with the resource, the client assigned resource environment identifier is an identifier that identifies a development environment associated with the resource, and the geographic region identifier identifies the physical geographic region of the resource.

13. The computer-implemented method of claim 8, further comprising:

determining, by the resource monitor, the resource identifier scan parameter and the resource attribute scan parameter based on a notification configuration container stored in a client datastore.

14. The computer-implemented method of claim 9, further comprising:

receiving, by the resource monitor from the communications system, a command execution request to execute a cloud computing command identified by the command execution request, wherein the command execution request includes a cloud computing resource identifier;

generating, by the resource monitor, a cloud computing command request based on the command execution request; and transmitting, by the resource monitor via the communication session, the cloud computing command request to execute the cloud computing command by the cluster computing system.

15. A non-transitory computer-readable device having instructions stored thereon that, when executed by at least one computing device, cause the at least one computing device to perform operations comprising:

receiving, by a resource monitor from a cloud monitoring system, a cloud monitoring notification, wherein the cloud monitoring notification indicates an occurrence of a monitored condition;

scanning, by the resource monitor, a cluster computing system for a resource having a resource identifier that matches a resource identifier scan parameter and a computing resource attribute that matches a resource attribute scan parameter, wherein:
  the resource identifier is an identifier assigned by a client of the cluster computing system to identify the resource managed by the client, and
  the scanning further comprises filtering at least one resource description from a resource description list based at least on whether the at least one resource description contains the resource identifier scan parameter;

generating, by the resource monitor, a resource notification request based at least on the scanning of the cluster computing system; and transmitting, by the resource monitor, the resource notification request to a communications system to notify a user that the resource has the computing resource attribute that matches the resource attribute scan parameter.

16. The non-transitory computer-readable device of claim 15, wherein the operations for scanning of the cluster computing system, when executed by the at least one computing device, further cause the at least one computing device to perform operations comprising:
creating, by the resource monitor, a communication session with the cluster computing system, wherein the communication session is associated with the client of the cluster computing system;
transmitting, by the resource monitor via the communication session, a resource search request to identify the resource having the computing resource attribute that matches the resource attribute scan parameter; and
receiving, by the resource monitor via the communication session, a resource search response comprising a list of cloud computing resource identifiers that correspond to the resource identified in response to the resource search request.

17. The non-transitory computer-readable device of claim 16, wherein the resource is associated with the client of the cluster computing system, a client assigned resource name, a cloud computing resource identifier, an elapsed time since creation, a resource instance count, a client assigned resource environment identifier, or a geographic region identifier.

18. The non-transitory computer-readable device of claim 17, wherein the operations for generating of the resource notification request, when executed by the at least one computing device, further cause the at least one computing device to perform operations comprising:
determining, by the resource monitor, the client assigned resource name, the elapsed time since creation, the resource instance count, the client assigned resource environment identifier, or the geographic region identifier for the resource based on the list of cloud computing resource identifiers; and
creating, by the resource monitor, the resource notification request, wherein the resource notification request further comprises the cloud computing resource identifier, the client assigned resource name, the elapsed time since creation, the resource instance count, the client assigned resource environment identifier, or the geographic region identifier.

19. The non-transitory computer-readable device of claim 18, wherein the operations further comprises:
determining, by the resource monitor, the resource identifier scan parameter and the resource attribute scan parameter based on a notification configuration container stored in a client datastore.

20. The non-transitory computer-readable device of claim 19, wherein the operations further comprises:
receiving, by the resource monitor from the communications system, a command execution request to execute a cloud computing command identified by the command execution request, wherein the command execution request includes the cloud computing resource identifier of the resource notification request;
generating, by the resource monitor, a cloud computing command request based on the command execution request; and
transmitting, by the resource monitor via the communication session, the cloud computing command request to execute the cloud computing command by the cluster computing system.

\* \* \* \* \*